United States Patent
Ishibashi

(10) Patent No.: US 11,068,215 B2
(45) Date of Patent: Jul. 20, 2021

(54) COMPUTER-READABLE STORAGE MEDIUM AND INFORMATION PROCESSING APPARATUS

(71) Applicant: BROTHER KOGYO KABUSHIKI KAISHA, Nagoya (JP)

(72) Inventor: Masayuki Ishibashi, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

(21) Appl. No.: 16/938,452

(22) Filed: Jul. 24, 2020

(65) Prior Publication Data
US 2021/0026576 A1 Jan. 28, 2021

(30) Foreign Application Priority Data
Jul. 25, 2019 (JP) .............................. JP2019-137192

(51) Int. Cl.
*G06F 3/12* (2006.01)

(52) U.S. Cl.
CPC .......... *G06F 3/1208* (2013.01); *G06F 3/1251* (2013.01); *G06F 3/1257* (2013.01)

(58) Field of Classification Search
CPC ..... G06F 3/1208; G06F 3/1251; G06F 3/1257
USPC ....................................................... 358/1.6
See application file for complete search history.

(56) References Cited

U.S. PATENT DOCUMENTS

| | | | | |
|---|---|---|---|---|
| 2001/0014171 A1* | 8/2001 | Iijima | .................. | H04N 13/128 382/154 |
| 2006/0152579 A1* | 7/2006 | Utsugi | ................. | H04N 13/302 348/51 |
| 2018/0082618 A1* | 3/2018 | Kishi | ...................... | G06T 19/20 |

FOREIGN PATENT DOCUMENTS

JP 2006-243388 A 9/2006

* cited by examiner

*Primary Examiner* — Allen H Nguyen
(74) *Attorney, Agent, or Firm* — Kenealy Vaidya LLP

(57) ABSTRACT

A non-transitory computer-readable storage medium storing computer-readable instructions for an information processing apparatus having a display and a user interface is provided. The computer-readable instructions cause the information processing apparatus to control the display to precedingly display a sheet image and a usable condition image, in response to receiving of an editing operation designating a predetermined position in one of the sheet image and the usable condition image, specify a corresponding position in the other of the sheet image and the usable condition image, and control the display to subsequently display the sheet image and the usable condition image edited as instructed by the editing operation or correspondingly to image-editing in the one of the sheet image and the usable condition image containing the predetermined position; and generate imaging data composing the sheet image having been edited and output the generated imaging data externally.

14 Claims, 12 Drawing Sheets

FIG. 4

| | | Template Database Unit (DB) 211A | | | Sheet Data Unit 214 | Usable Condition Data Unit 215 | |
|---|---|---|---|---|---|---|---|
| | Bow Style | Wrapping Style | Stereoscopic Object | Template Data Unit | | | |
| Gift Wrapping (Usage A) | 2 loops | Crisscross | Rectangular | Template Data Unit 213(213A) | | | Pair-Correspondence Information 221A |
| | 2 loops | Crisscross | Round | Template Data Unit 213(213B) | | | Pair-Correspondence Information 221B |
| | 2 loops | Straight | Rectangular | Template Data Unit 213(213C) | | | Pair-Correspondence Information 221C |
| | 2 loops | Straight | Round | Template Data Unit 213(213D) | | | ... |
| | 2 loops | — | Bag | Template Data Unit 213(213E) | | | |
| | 4 loops | Crisscross | Rectangular | Template Data Unit 213 | | | Pair-Correspondence Information 222A |
| | 4 loops | — | Bag | Template Data Unit 213 | | | Pair-Correspondence Information 222B |
| | Multiple loops | Crisscross | Rectangular | Template Data Unit 213 | | | ... |
| | Multiple loops | — | Bag | Template Data Unit 213 | | | |
| | No loop | Crisscross | Rectangular | Template Data Unit 213 | | | Identical-part Correspondence Information 223A |
| | No loop | — | Bag | Template Data Unit 213 | | | Identical-part Correspondence Information 223B |
| Bottle Wrapping (Usage B) | | Template Database Unit (DB) 211B | | | | | Identical-part Correspondence Information 223C |
| | | | | Template Data Unit 218 | | | Identical-part Correspondence Information 223D |
| | | | | Template Data Unit 218 | | | |
| Origami (Usage C) | | Template Database Unit (DB) 211C | | | | | |
| | | | | Template Data Unit 219 | | | |
| | | | | Template Data Unit 219 | | | |

12B

COMPUTER-READABLE STORAGE MEDIUM AND INFORMATION PROCESSING APPARATUS

CROSS REFERENCE TO RELATED APPLICATION

This application claims priority from Japanese Patent Application No. 2019-137192, filed on Jul. 25, 2019, the entire subject matter of which is incorporated herein by reference.

BACKGROUND

Technical Field

An aspect of the present disclosure is related to a computer-readable storage medium and an information processing apparatus.

Related Art

A printable object may be printed on a sheet, and an image representing the sheet, with the printed object thereon, may be edited in an information processing apparatus through a program, which may be stored in a computer-readable storage medium. The object in the edited image may be printed by a printer on the sheet.

SUMMARY

A printer may be capable of printing an object on a ribbon, which may be a strip of planar sheet in an unused condition. Once an object is printed on the ribbon, the ribbon may be turned into a three-dimensional or stereoscopic form, having, for example, loops, tails, and a knot, by being wrapped and tied around a stereoscopic object, e.g., a box.

Through a conventional editing program, however, a user may edit an image of the object to be printed on the ribbon while viewing a preview image of the ribbon before printing in the planar condition. Therefore, it may be difficult for the user to visualize a final or overall image of the ribbon turned into the stereoscopic shape until the ribbon with the object printed thereon is wrapped around the stereoscopic object.

The present disclosure is advantageous in that a computer readable storage medium storing computer readable instructions, which enable a user to edit an image for a sheet that may be deformed into a stereoscopic format, and an information processing apparatus, are provided.

According to an aspect of the present disclosure, a non-transitory computer-readable storage medium storing computer-readable instructions for an information processing apparatus having a display and a user interface is provided. The computer-readable instructions, when executed by a processor of the information processing apparatus, cause the information processing apparatus to perform controlling the display to precedingly display a sheet image representing a sheet and a usable condition image representing the sheet in a usable condition deformed stereoscopically to be used by a user; in response to receiving of an editing operation to instruct the information processing apparatus to perform image-editing, through the user interface, designating a predetermined position in one of the sheet image and the usable condition image being precedingly displayed in the display, specifying a corresponding position corresponding to the predetermined position, the corresponding position being contained in the other of the sheet image and the usable condition image, and controlling the display to subsequently display the sheet image containing one of the predetermined position and the corresponding position, the sheet image being, when containing the predetermined position, edited as instructed by the editing operation, but when containing the corresponding position, edited correspondingly to the image-editing in the usable condition image; and the usable condition image containing the other of the predetermined position and the corresponding position, the sheet image being, when containing the predetermined position, edited as instructed by the editing operation, but when containing the corresponding position, edited correspondingly to the image-editing in the sheet image; and generating imaging data to be used for creating the sheet as represented in the sheet image having been edited and displayed subsequently in the display and outputting the generated imaging data externally.

According to another aspect of the present disclosure, an information processing apparatus, having a display, a user interface, and a control device, is provided. The control device is configured to control the display to precedingly display a sheet image representing a sheet and a usable condition image representing the sheet in a usable condition deformed stereoscopically to be used by a user; in response to receiving of an editing operation to instruct the information processing apparatus to perform image-editing, through the user interface, designating a predetermined position in one of the sheet image and the usable condition image being precedingly displayed in the display, specify a corresponding position corresponding to the predetermined position, the corresponding position being contained in the other of the sheet image and the usable condition image, and control the display to subsequently display the sheet image containing one of the predetermined position and the corresponding position, the sheet image being, when containing the predetermined position, edited as instructed by the editing operation, but when containing the corresponding position, edited correspondingly to the image-editing in the usable condition image; and the usable condition image containing the other of the predetermined position and the corresponding position, the sheet image being, when containing the predetermined position, edited as instructed by the editing operation, but when containing the corresponding position, edited correspondingly to the image-editing in the sheet image; and generate imaging data to be used for creating the sheet as represented in the sheet image having been edited and displayed subsequently in the display and output the generated imaging data externally.

BRIEF DESCRIPTION OF THE ACCOMPANYING DRAWINGS

Figure 1:
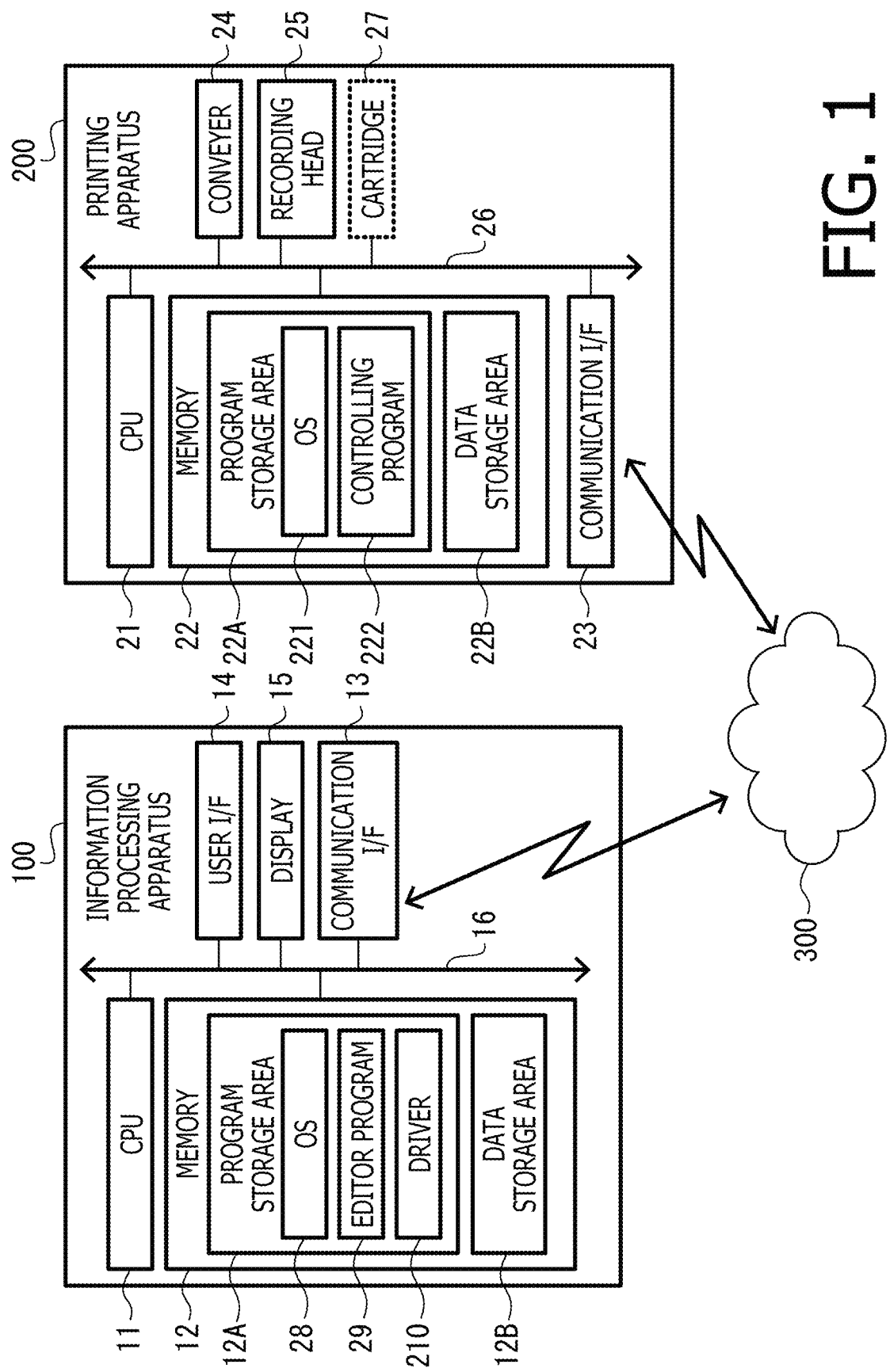
FIG. 1 is a block diagram to illustrate configurations of an information processing apparatus 100 and an image forming apparatus 200 according to an embodiment of the present disclosure.

FIGS. 3A-3D are illustrative views of a usage selectable screen 41, a bow-style selectable screen 42, a stereoscopic-object selectable screen 43, and a wrapping-style selectable screen 44, respectively, to be displayed in a display 15 of the information processing apparatus 100 according to the embodiment of the present disclosure.

FIG. 4 is a table to illustrate data structures of template databases 211A-211C in the according to the embodiment of the present disclosure.

Figure 5A:
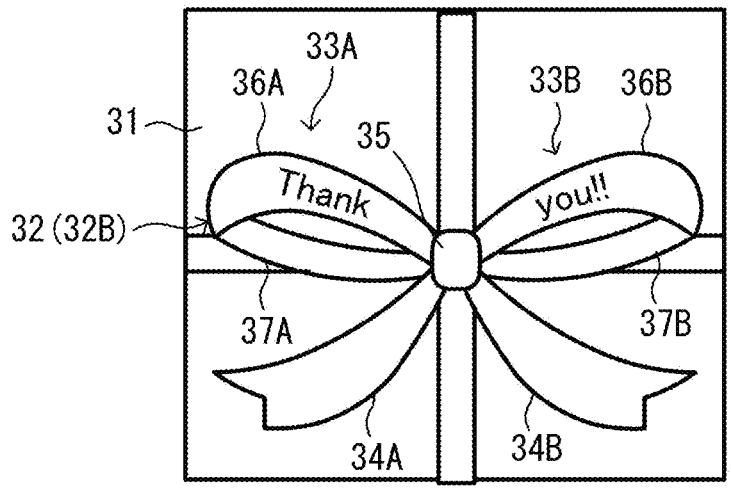
Figure 5B:
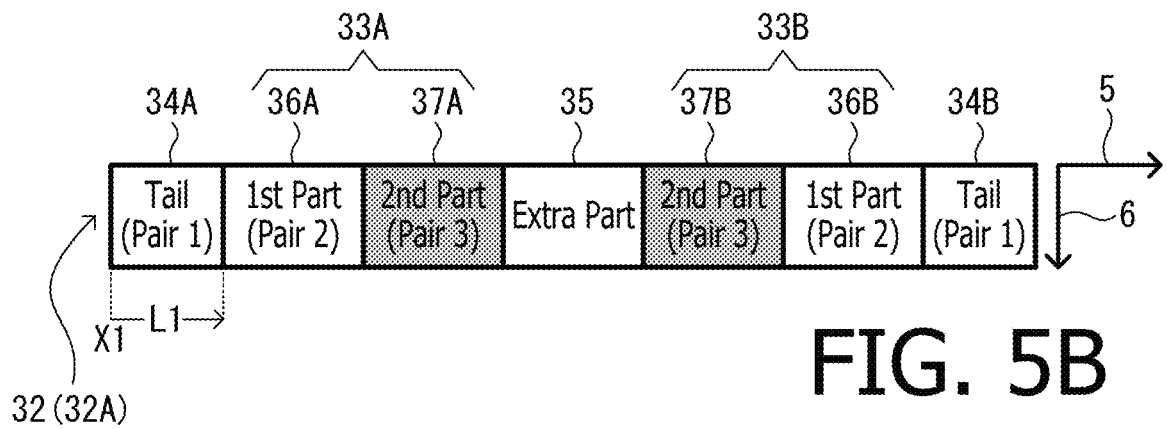
Figure 5C:
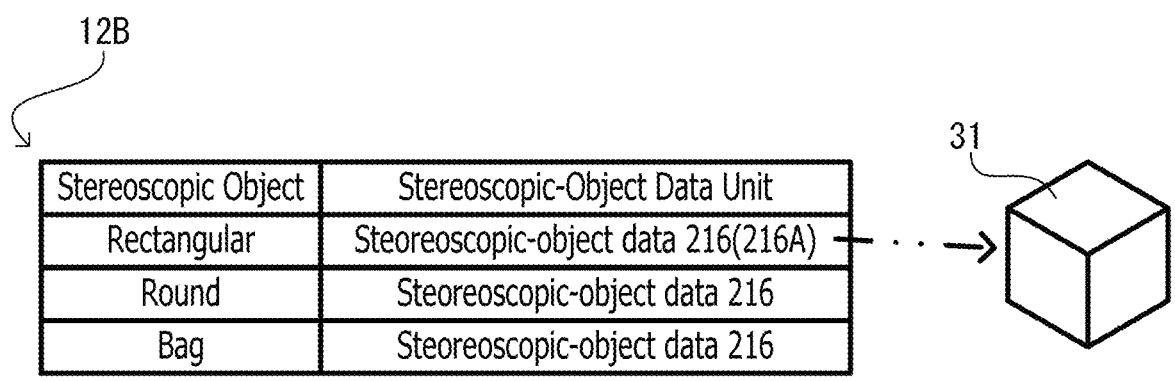

FIGS. 5A-5C are illustrative views of a ribbon 32 in a usable condition, the ribbon 32 in a sheet format, and stereoscopic data units 216 for different stereoscopic objects, respectively, according to the embodiment of the present disclosure.

Figure 6A:
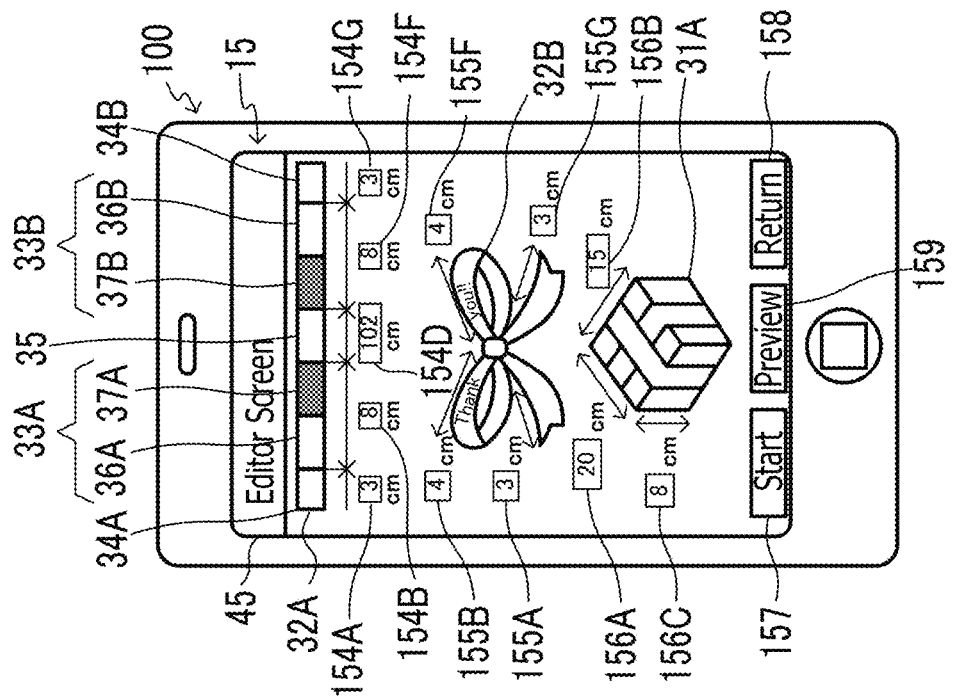
Figure 6B:
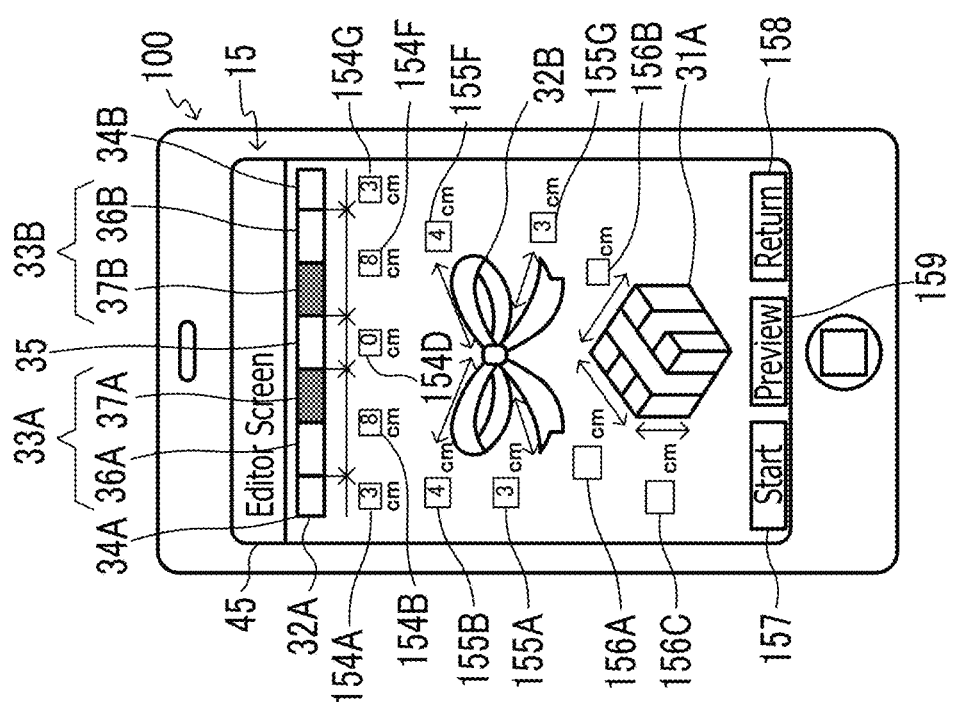

FIGS. 6A-6B are illustrative views of an editor screen 45 to be displayed in S11 and the editor screen 45 to be displayed as a result of a text-adding process, respectively, according to the embodiment of the present disclosure.

Figure 7A:
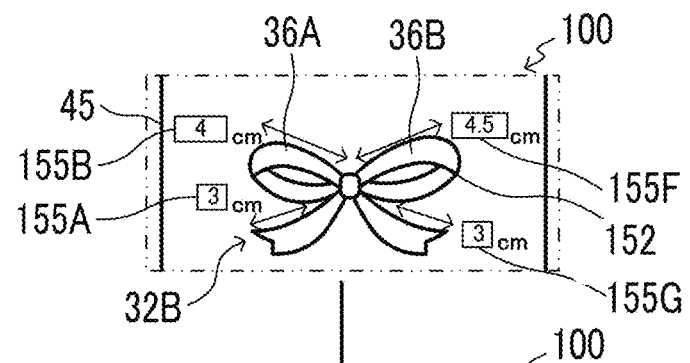
Figure 7B:
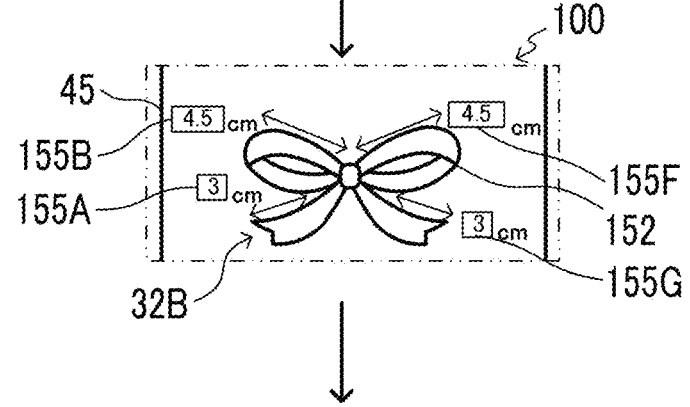
Figure 7C:
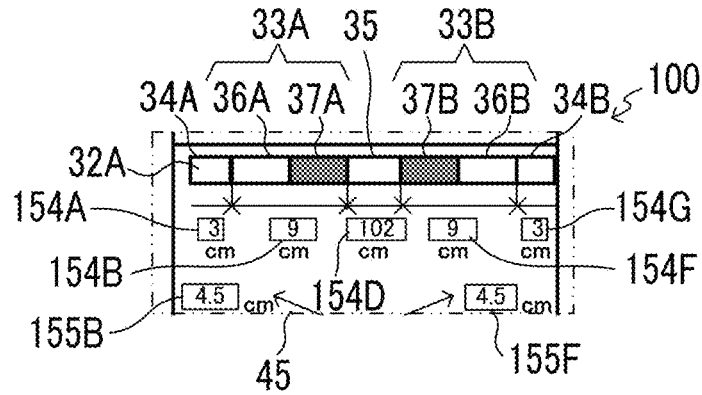

FIGS. 7A-7C are illustrative views of a text-adding process in S111, to add text on a size-designative object 155F, to a size-designative object 155B, and to size-designative objects 154B, 154F, respectively, according to the embodiment of the present disclosure.

Figure 8A:
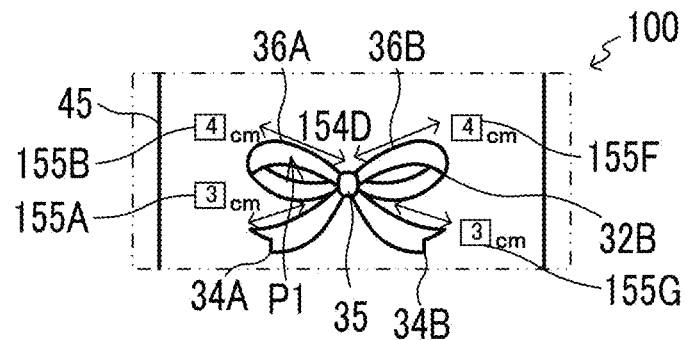
Figure 8B:
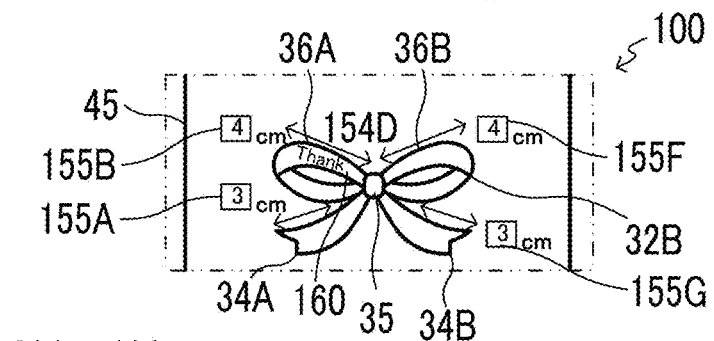
Figure 8C:
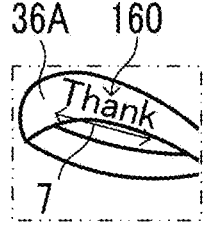
Figure 8D:
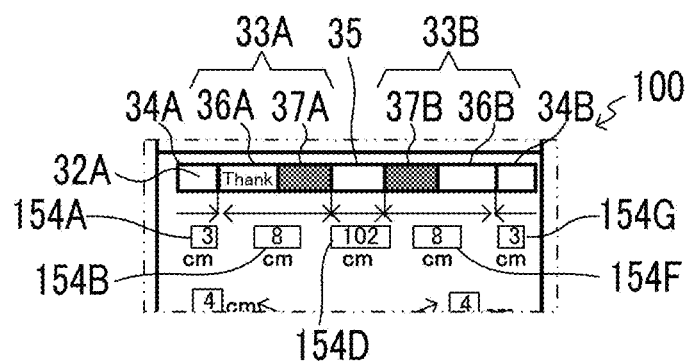

FIGS. 8A-8B are illustrative views of a first exemplary text-adding process in S16, to designate a designative position P1 in a usable condition image 32B, and to add a text object 160 in the usable condition image 32B, respectively, according to the embodiment of the present disclosure. FIG. 8C is an illustrative view of an aligning direction 7, with which characters align in the text object 160, according to the embodiment of the present disclosure. FIG. 8D is an illustrative view of the text-adding process in S16 to add a text object 160 in a sheet image 32A according to the embodiment of the present disclosure.

FIGS. 9A-9D are illustrative views of a second exemplary text-adding process in S16, when the text object 160 is partly located outside a first part 36A in the usable condition image 32B, when the text object 160 is added on the resized first part 36A in the usable condition image 32B, when the text object 160 is resized to be added on the first part 36A in the usable condition image 32B, and when the size-designative objects 154, 155 are resized in the usable condition image 32B, respectively, according to the embodiment of the present disclosure.

Figure 10:
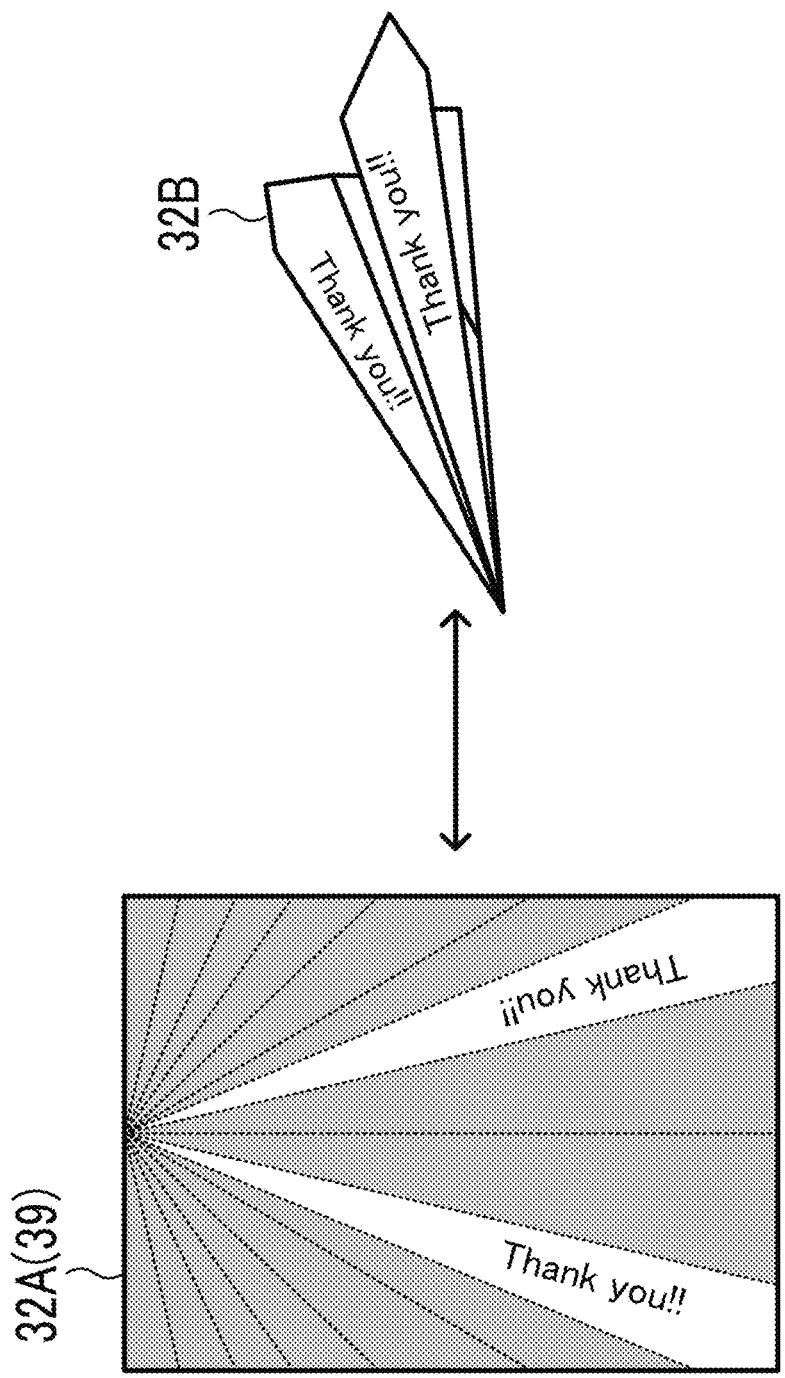

FIG. 10 shows another exemplary illustrative views of a sheet image 32A and a usable condition image 32B according to the embodiment of the present disclosure.

DETAILED DESCRIPTION

In the following paragraphs, with reference to the accompanying drawings, described will be an embodiment of the present disclosure. It is noted that various connections may be set forth between elements in the following description. These connections in general and, unless specified otherwise, may be direct or indirect and that this specification is not intended to be limiting in this respect. It will be understood that those skilled in the art will appreciate that there are numerous variations and permutations of an information processing apparatus and a computer-readable storage medium that fall within the spirit and scope of the invention.

As shown in FIG. 1, an information processing apparatus 100 and an image forming apparatus 200 may communicate with each other through a communication network 300. The information processing apparatus 100 includes, for example, a smartphone, a tablet terminal, and a personal computer. The information processing apparatus 100 may generate imaging data, which composes an image to be formed on a sheet in the image forming apparatus 200. The sheet may include, for example, a strip of ribbon 32 (see FIG. 5B).

The imaging data may be transmitted from the information processing apparatus 100 to the image forming apparatus 200 through the communication network 300. The communication network 300 may be, for example, wired LAN, wireless LAN, and a combination of the wired and wireless LANs. However, the information processing apparatus 100 and the image forming apparatus 200 may not necessarily communicate through LAN(s), but the information processing apparatus 100 and the image forming apparatus 200 may be connected to communicate with each other through, for example, a USB cable.

The image forming apparatus 200 may include, for example, a label printer capable of forming images on a strip of ribbon 32. The image forming apparatus 200 may form an image on the ribbon 32 based on the imaging data received through, for example, the communication network 300, and discharge the ribbon 32 with the image formed thereon outside.

The information processing apparatus 100 includes, but not limited to, a CPU 11, a memory 12, a communication interface (I/F) 13, a user interface (I/F) 14, a display 15, and a communication bus 16. The components in the information processing apparatus 100 are connected to communicate with one another through the communication bus 16.

The CPU 11 may control overall actions and processes in the image forming apparatus 100. The CPU 11 may, in response to operations input by a user through the user I/F 14, read and run programs stored in the memory 12.

The memory 12 includes memory media such as ROM, RAM, and EEPROM, and a buffer in the CPU 11. The memory 12 may include any computer-readable storage medium, which is a non-transitory medium. The non-transitory medium may include a tangible medium. Meanwhile, electrical signals conveying a program that is downloadable through the Internet from, for example, a server (not shown), may form a computer-readable signal medium but may not form a non-transitory computer-readable storage medium.

The memory 12 has a program storage area 12A and a data storage area 12B. The program storage area 12A may store programs, including an OS 28 and an editor program 29. The OS 28 is a basic program in the information processing apparatus 100. The program storage area 12A may further store a driver 210.

The editor program 29 may, in response to operations by a user input through the user I/F 14, generate imaging data. In order to generate the imaging data, the editor program 29 may exchange various kinds of information and data with the OS 28. The editor program 29 may include a single program and a collection of program modules. The editor program 29 will be described further below.

The data storage area 12B may store various kinds of information and data to be used and processed by the editor program 29 and the OS 28.

The communication I/F 13 may include, for example, a communication interface for Wi-Fi (registered trademark). When the information processing apparatus 100 is connected with the image forming apparatus 200 through a USB cable, the communication I/F 13 is in compliance with the USB standard. The communication I/F 13 may transmit the information and the data output from the OS 28 to the image forming apparatus 200 through the communication network 300. Moreover, the communication I/F 13 may output the information and the data received from the image forming apparatus 200 to the OS 28.

The user I/F 14 is an interface, through which the operations by the user may be input. In particular, the user I/F 14 may include a touch sensor and hardware buttons (not shown). The touch sensor may be in a form of transparent film and may be arranged on a surface of the display 15. The touch sensor may output location information, i.e., information of a location on a surface thereof being touched by the user, to the CPU 11. The buttons may output operating signals assigned thereto to the CPU 11.

The display 15 includes, for example, a liquid crystal display and an organic EL display, and has a displaying surface, on which screens for the ongoing operations may be displayed. The screens may contain objects including, for example, text, image, icon, and text box. The user's operations may include, for example, operations to designate the object(s) by use of an input device or a pointer including the user's finger, a stylus, and a pen, and operations to input text and/or numerical figures in the object(s).

The image forming apparatus 200 includes, but not limited to, a CPU 21, a memory 22, a communication I/F 23, a cartridge 27, a conveyer 24, a recording head 25, and a communication bus 26. The components in the image forming apparatus 200 are connected to communicate with one another through the communication bus 26. The CPU 21, the memory 22, and the communication I/F 23 in the image forming apparatus 200 may function in the same manner as, or similarly to, the CPU 11, the memory 12, and the communication I/F 13, respectively, in the information processing apparatus 100; therefore, detailed description of those is herein omitted. The conveyer 24 may convey the ribbon 32 unreeled from the cartridge 27 to the recording head 25. The recording head 25 may form an image composed of the imaging data on a sheet being the ribbon 32. The image forming apparatus 200 may form images on sheets in one of known printing technics including, for example, inkjet-printing, electro-photographic printing, and thermal-transfer printing.

In the following paragraphs, processes to be conducted by the CPU 11 in compliance with instructions described in the programs stored in the memory 12 will be explained. In this context, terms to express the actions in the information processing apparatus 100 such as judging, extracting, selecting, calculating, determining, specifying, obtaining, accepting, controlling, and setting may represent processes conducted by the CPU 11. The processes to be conducted by the CPU 11 may include control over hardware devices by a controller, including the OS 28, in the information processing apparatus 100. Meanwhile, an act of obtaining may not necessarily be limited to a result of requesting. In other words, the CPU 11 may receive data without requesting the data, and the act of receiving may still be expressed as "the CPU 11 obtains the data." Moreover, a term "data" in the present disclosure may mean a bit string readable by a computer. Data units containing substantially the same contents but in different formats may be regarded as a same data unit, and a term "information" may be regarded similarly. Terms for actions of "requesting," "instructing," and "commanding" may represent outputting information that composes the request, the instruction, and the command, respectively, to another party. Meanwhile, the information that composes the request, the instruction, and the command may be expressed by terms "request," "instruction," and "command," respectively.

Moreover, processes to be conducted by the CPU 11 in compliance with the commands contained in the programs may be described in simplified or anthropomorphic expressions such as "the CPU 11 conducts the process," "the editor program 29 conducts the process," or "the information processing apparatus 100 conducts the process." Further, input or output of information conducted by the programs through the communication I/F 13 or the user I/F 14 may be described also in simplified or anthropomorphic expressions such "the CPU 11 receives the information," "the editor program 29," or "the information processing apparatus 100 obtains the information."

Moreover, a process conducted by the CPU 11 to determine, for example, whether information "A" indicates occurrence of an event "B" may be described in an expression such as "the CPU 11 determines occurrence of an event "B" based on information "A." Further, a process conducted by the CPU 11 to determine, for example, whether information "A" indicates occurrence of an event "B" or "C" may be described in an expression such as "the CPU 11 determines whether an event "B" or "C" occurs.

In the present disclosure, the terms "data" and "information" may be considered to have common meanings in a sense that they both may denote a bit or a string of bits that may be processed by a computer. However, data and information may be distinguished from each other by meaning(s) of content in the bit or the bit string. That is, while the bit or the bit string in the data may be processed by the computer without considering the meaning of the content thereof, actions of the computer may vary depending on the content of the bit or the bit string in the information. Information may be contained in a command, which may be a controlling signal transmitted from the computer to a receiver device to cause the receiver device to act responsively to the information, or the command itself may have the characteristics of information.

While formats of data and information (e.g., text format, binary format, and flag format) may be converted among a plurality of computers, the data and the information may be regarded as identical data and information as long as the contents of the data and the information before and after the conversion are maintained unchanged. For example, information indicating a quantity "2" may be described as "0x32" in ASCII code in the text format to be stored in one computer and as "10" in the binary format to be stored in another computer.

Meanwhile, data and information may not necessarily be distinctively exclusive to each other but may be occasionally equated with each other. For example, data may be temporarily regarded as information, and vice versa. For another example, data handled in one device may be handled as information in another device, and vice versa. For another example, information may be extracted from data, and vice versa.

Moreover, in the present disclosure, a phrase "in response to" may mean that once a condition described in a preceding clause including the phrase is met, an action described in a subsequent clause may be performed. In this regard, the action described in the subsequent clause may not necessarily be performed immediately after the condition in the preceding clause is met as long as the action is performed later than the condition being met.

In the following paragraphs, described with reference to FIGS. 2-10 will be a process to be conducted by the editor program 29.

Figure 2A:
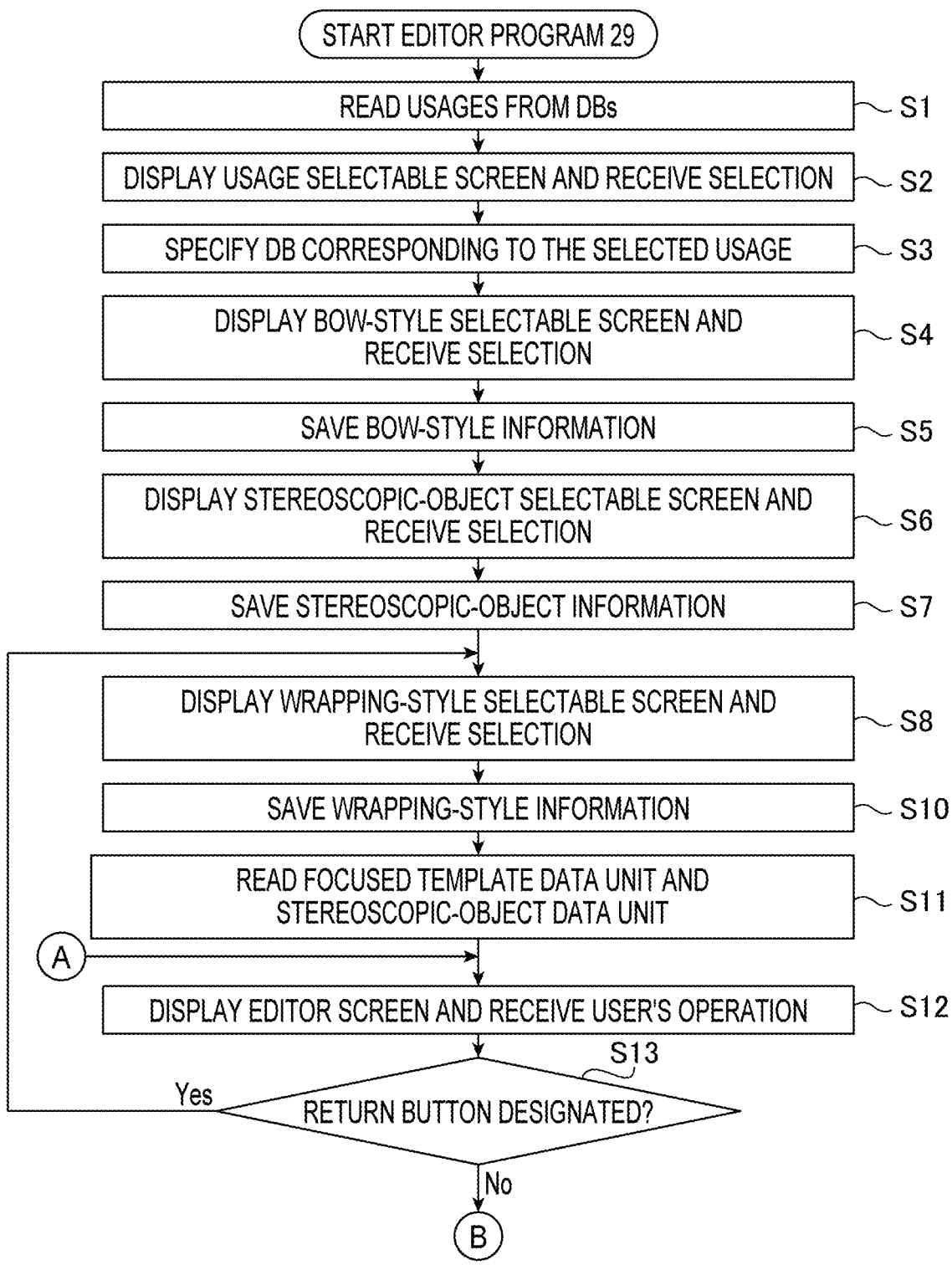
FIGS. 2A-2B are flowcharts to illustrate flows of steps to be executed by an editor program 29 in the information processing apparatus 100 according to the embodiment of the present disclosure.

As shown in FIG. 2A, as the editor program 29 starts, in S1, the editor program 29 refers to template databases (DBs) 211A-211C (see FIG. 4) and reads usages A-C corresponding to the DBs 211A-211C.

The DBs 211A-211C shown in FIG. 4 are stored in the data storage area 12B. The DBs 211A-211C may be stored in the data storage area 12B, for example, upon installation of the editor program 29 in the information processing apparatus 100. Optionally, the DBs 211A-211C may be downloaded from a server (not shown), which may be connected to the communication network 300 or the Internet (not shown). Optionally, further, the DBs 211A-211C may be embedded in the editor program 29.

The DBs 211A, 211B, 211C correspond to different usages A, B, C of the sheet, respectively. The DB 211A corresponds to the usage A, which is gift wrapping, and includes a plurality of template data units 213. The template data units 213 include a plurality of templates, which exhibit different patterns of bow style, stereoscopic object, and wrapping style, prepared for the usage A. In other words, each template unit 213 contains information corresponding to the usage A. One of the templates may be used to edit an image to be formed on the ribbon 32. The usage B corresponding to the DB 211B may as well include a plurality of template data units 218, which exhibit different patterns corresponding to the usage B. The usage C corresponding to the DB 211C may as well include a plurality of template data units 219, which exhibit different patterns corresponding to the usage B.

Among the plurality of template data units 213 shown in FIG. 4, a template data unit 213A, for example, is prepared for the usage of gift wrapping, in a bow style of two (2) loops, a wrapping style of crisscross, and a stereoscopic object of a rectangular box. For another example, a template data unit 213B is prepared for the usage of gift wrapping, in the bow style of two (2) loops, the wrapping style of crisscross, and a stereoscopic object of a round box. For another example, the template data units 213C-213E are prepared for the usage of gift wrapping, in the bow style of two (2) loops, and in wrapping styles and stereoscopic objects that are different from one another. In the following paragraphs, a data structure of the template data unit 213A will be described as a representing one of the template data units 213.

When a stereoscopic object 31 is decorated, a user may wrap the ribbon 32 (see FIG. 5B) in a sheet format around the stereoscopic object 31. As the user ties the ribbon 32 on the stereoscopic object 31, a pair of loops 32A, 33B, a pair of tails 34A, 34B, and an extra part 35 may be formed in the ribbon 32 (see FIG. 5A). The extra part 35 includes a knot and parts that are wrapped around surfaces of the stereoscopic object 31. By forming these parts, the ribbon 32 may be placed in a usable condition to be used for gift wrapping. In other words, the ribbon 32 in the usable condition may have a stereoscopic form to be used with the stereoscopic object 31 by the user. The loop 33A includes a first part 36A and a second part 37A, and the loop 33B includes a first part 37A and a second part 37B. The first parts 36A, 36B are parts that are more apparent to the user, and the second parts 36B, 37B are parts that are less apparent to the user, when the user stereoscopically views the ribbon 31 on the stereoscopic object 31. Arrangement of the first parts 36A, 36B and the second parts 37A, 37B may be set in advance based on arrangement manners including the manners for the bow styles and wrapping styles.

As shown in FIG. 4, the template data unit 213A includes a sheet data unit 214, which composes an image of the ribbon 32 in the sheet format. In the present description, the image of the ribbon 32 in the sheet format may be called as a sheet image 32A. In other words, the sheet image 32A represents the ribbon 32 in the sheet format. As shown in FIG. 5B, the sheet image 32A is divided into parts for the pair of loops 33A, 33B, the pair of tails 34A, 34B, and the extra part 35. The sheet data unit 214 includes a set of pieces of information, which indicate a planar shape, a color, and a size of each part in the sheet image 32A. In the following description, the information indicating the planar shape of a part of the ribbon 32 will be called as planar-format information, the information indicating the size of the part of the ribbon 32 will be called as size information, and the information indicating the color of the part of the ribbon 32 will be called as color information.

The parts in the sheet image 32A have rectangular shapes; therefore, the planar-format information for each part in the sheet data unit 214 includes information indicating an end position and a length. The end position indicates a position of an end of the corresponding part in a lengthwise direction 5. The lengthwise direction 5 is a direction of the sheet image 32A, i.e., the ribbon 32 in the sheet format, extending longitudinally. Moreover, the lengthwise direction 5 coincides with a direction, in which the ribbon 32 may be conveyed in the image forming apparatus 200. The length of a part of the ribbon 32 is a size of the part in the lengthwise direction 5 with reference to the end position. For example, planar-format information of the tail 34 part having the rectangular shape may include X1, which indicates an end position of the tail 34A, and L1, which indicates a length of the tail 34A from the end position X1. For example, X1 indicating a position of an end of the ribbon 32 on one side may be zero (0), and L1 may indicate 3 cm. For each part in the sheet image 32A, each template data unit 213 includes planar-format information, size information, and color information. Based on the planar-format information and the size information, when the sheet image 32 is edited, the editor program 29 may recognize which part of the sheet image 32 the user edited, and at which position in the part the user edited.

In the sheet data unit 214, the color information for each part in the sheet image 32A indicates a color of the corresponding part. In particular, the second parts 37A, 37B correspond to parts of the ribbon 32 that may be less apparent to the user when the ribbon 32 is in the usable condition; therefore, a color of the second parts 37A, 37B in the sheet image 32A may be expressed in grey (see FIG. 5B). Colors of the remainder parts in the sheet image 32A may be other than grey and different from one another. Alternately, the colors of the remainder parts of the sheet image 32A may be a single color corresponding to the actual color of the ribbon 32. Optionally, the pair of tails 34A, 34B may be in a same color, and/or the pair of the first parts 36A, 36B may be in another same color.

In the sheet data unit 214, the size information indicates a size of the corresponding part. In particular, the size information includes a size in the lengthwise direction 5 and a size of an orthogonal direction 6, which is orthogonal to the lengthwise direction 5, of the part.

As shown in FIG. 5A, the ribbon 32 in the usable condition has paired parts. The tails 34A, 34B are paired and form a pair 1, as indicated in FIG. 5B. The first parts 36A, 36B are paired and form a pair 2, as indicated in FIG. 5B; and the second parts 37A, 37B are paired and form a pair 3, as indicated in FIG. 5. As shown in FIG. 4, the sheet data unit 214 further includes pair-correspondence information, which associates the paired parts in the sheet image 32A with each other. In particular, the sheet data unit 214 includes units of pair-correspondence information 221A, 221B, 221C. The pair-correspondence information 221A associates the paired tails 34A, 34B in the pair 1 with each other; the pair-correspondence information 221B associates the paired first parts 36A, 36B in the pair 2 with each other; and the pair-correspondence information 221C associates the paired second parts 37A, 37B in the pair 3 with each other (see FIG. 4).

As shown in FIG. 4, the template data unit 213A further includes a usable condition data unit 215. The usable condition data unit 215 composes an image of the ribbon 32 in the usable condition. In the following description, the image of the ribbon 32 in the usable condition may be called as a usable condition image 32B. In other words, the usable condition image 32B represents the ribbon 32 in the usable condition. The usable condition image 32B represents an image of the ribbon 32, deformed from the sheet format into a stereoscopic format, in the usable condition. The usable condition data unit 215 includes an assembly of units of information concerning a stereoscopic format, a color, a size, and an orientation of each part in the usable condition image 32B. In the following description, the unit of information indicating the stereoscopic format will be called as stereoscopic-format information, and the unit of information indicating the orientation will be called as orientation information.

In the usable condition data unit 215, the stereoscopic-format information indicates points, e.g., vertices, folding points, etc., which define the corresponding part. The color information indicates a color of the corresponding part. The size information indicates a size of the corresponding part. For example, the size information may indicate a size of the corresponding part in the lengthwise direction 5 and the orthogonal direction 6. The orientation information indicates an aligning direction 7 (see FIG. 8C), with which, when a text object is laid out on the corresponding part of the usable condition image 32B, characters included in the text object are oriented.

The usable condition image 32B includes, as well as the sheet image 32A, paired parts. In particular, the tails 34A, 34B (see FIG. 5A) are paired to form a pair 4, and the first parts 36A, 36B (see FIG. 5A) are paired to form a pair 5. The usable condition data 215 includes pair-correspondence information 222A (see FIG. 4), which associates the paired tails 34A, 34B in the pair 4 with each other; and pair-correspondence information 222B (see FIG. 4), which associates the paired first parts 36A, 36B with each other.

The sheet image 32A and the usable condition image 32B have the parts that are common to each other. In particular, as shown in FIGS. 5A-5B, the tail 34A in the sheet image 32A and the tail 34A in the usable condition image 32B are paired and both form a part 1 of the ribbon 32. In other words, the part 1 in the sheet image 32A and the part 1 in the usable condition image 32B are identical. The first part 36A in the sheet image 32A and the first part 36A in the usable condition image 32B are paired and both form a part 2 of the ribbon 32. In other words, the part 2 in the sheet image 32A and the part 2 in the usable condition image 32B are identical. The first part 36B in the sheet image 32A and the first part 36B in the usable condition image 32B are paired and both form a part 3 of the ribbon 32. In other words, the part 3 in the sheet image 32A and the part 3 in the usable condition image 32B are identical. The tail 34B in the sheet image 32A and the tail 34B in the usable condition image 32B are paired and both form a part 4 in the ribbon 32. In other words, the part 4 in the sheet image 32A and the part 4 in the usable condition image 32B are identical. The template data unit 213A further includes units of identical-part correspondence information 223A-223D. The identical-part correspondence information 223A associates the part 1 in the sheet image 32A and the part 1 in the usable condition image 32B with each other, the identical-part correspondence information 223B associates the part 2 in the sheet image 32A and the part 2 in the usable condition image 32B with each other, the identical-part correspondence information 223C associates the part 3 in the sheet image 32A and the part 3 in the usable condition image 32B with each other, and the identical-part correspondence 223D associates the part 4 in the sheet image 32A and the part 4 in the usable condition image 32B with each other.

The data storage area 12B further stores a plurality of stereoscopic-object data units 216 for a plurality of stereoscopic objects 31 (see FIG. 5C). Each stereoscopic-object data unit 216 is a unit of image data composing an image of a corresponding one of the stereoscopic objects 31 and includes information concerning a stereoscopic form, a color, and a size of the stereoscopic object. In the following description, the image of the stereoscopic object 31 will be called as a stereoscopic object image 31A. For example, a stereoscopic data unit 216A among the plurality of stereoscopic-object data units 216 may be a unit of image data composing a rectangular box, which is one of the stereoscopic objects 31. The stereoscopic data units 216 may further include, but not limited to, a stereoscopic data unit composing a round box and a stereoscopic data unit composing a bag.

Referring back to FIG. 2A, following S1, the editor program 29 in S2 controls the display 15 to display a usage selectable screen 41 (see FIG. 3A) exhibiting options of the usages A-C, which are read in S1. The editor program 29 may create or obtain displayable data, which composes a screen to be displayed, and input the created or obtained displayable data in the OS 28 to cause the display 15 to display the screen through the OS 28.

Figure 3A:
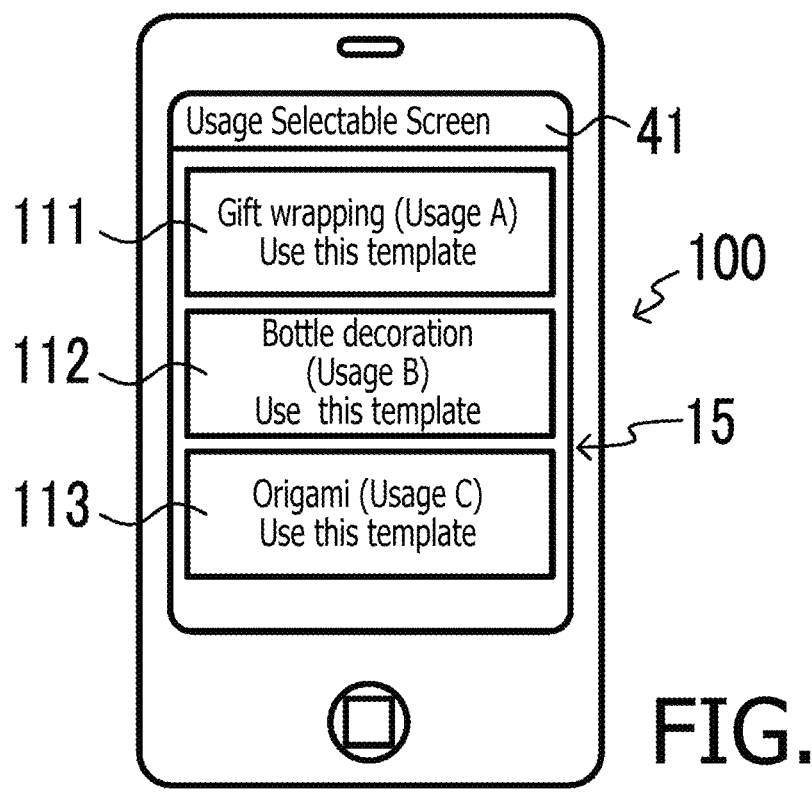
Figure 3B:
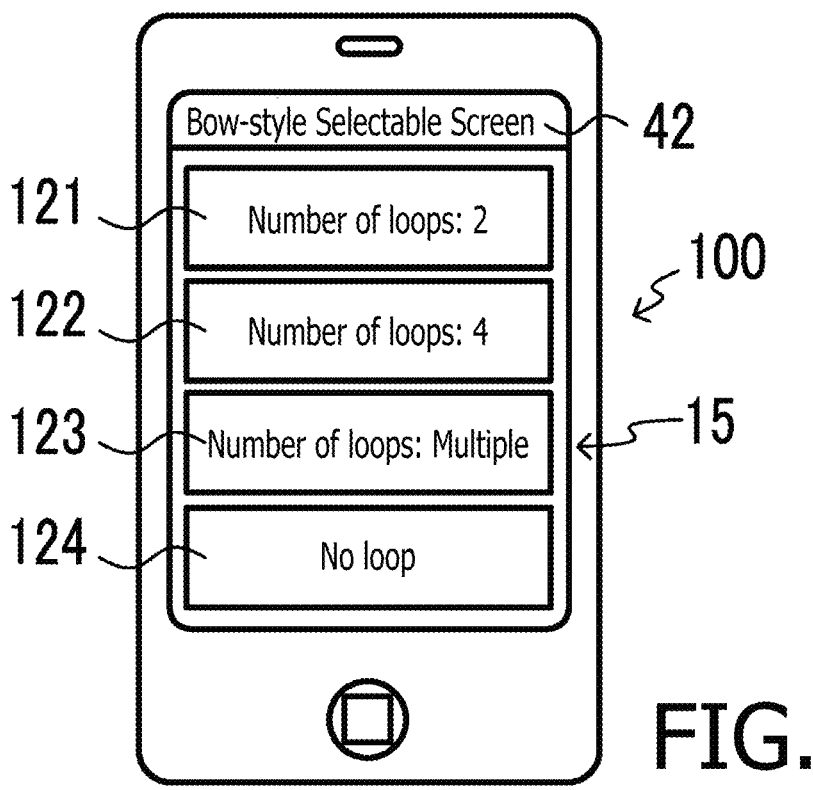
Figure 3C:
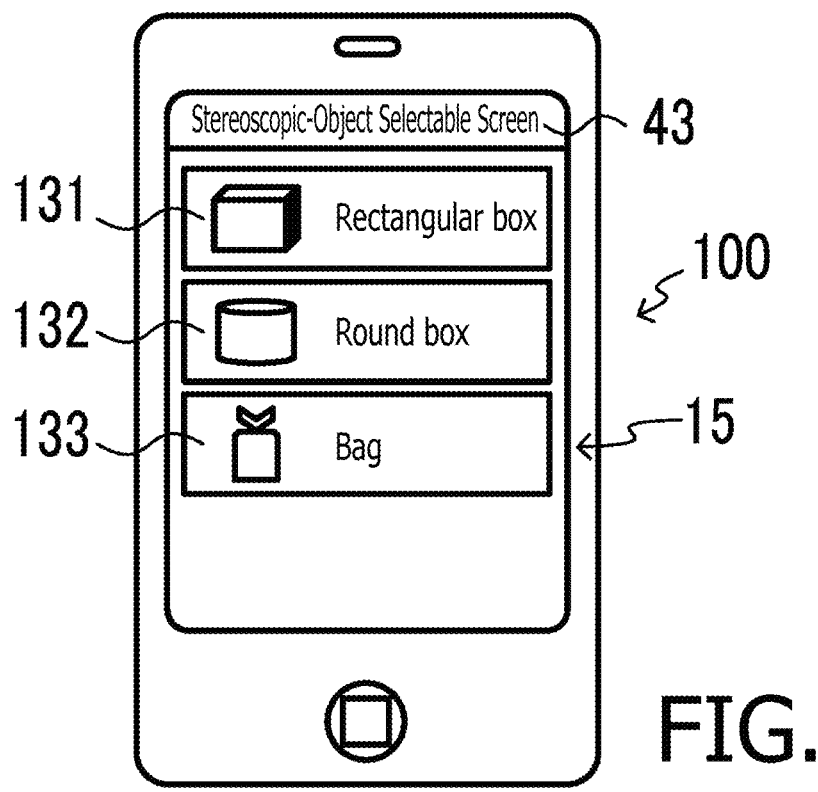
Figure 3D:
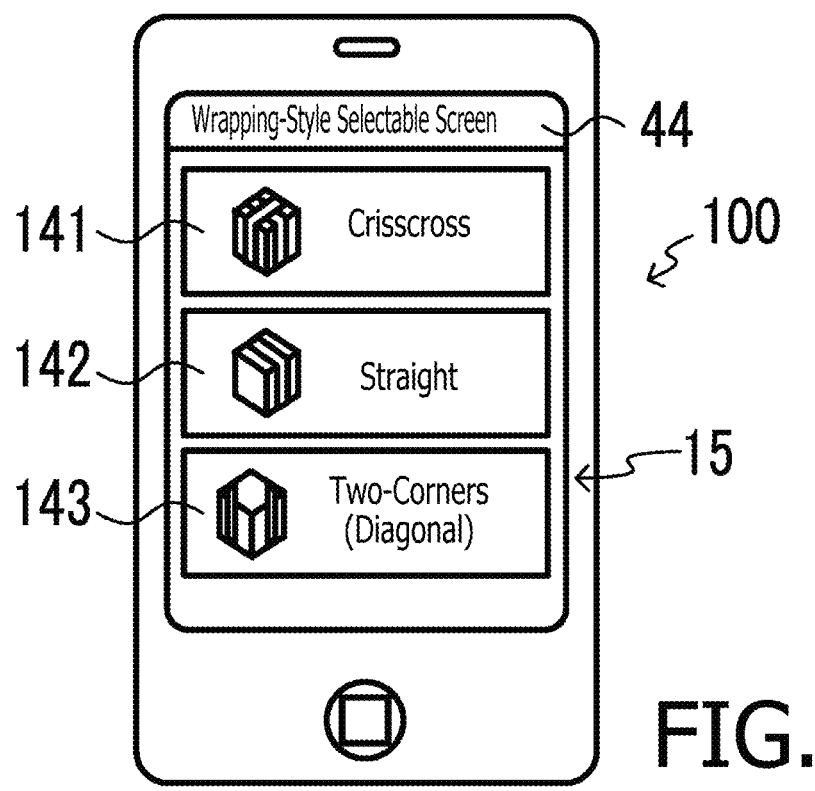

The usage selectable screen 41 includes, as shown in FIG. 3A, designative objects 111-113. The designative objects 111-113 exhibit the usages A-C of the ribbon 32 in the usable condition in figures or text, and a user may select one of the designative objects 111-113 through the user I/F 14. The designative objects 111-113 correspond to the usage A for gift wrapping, the usage B for bottle decoration, and the usage C for origami, respectively. For the usage A, in particular, the user may wrap the ribbon 32 in the sheet format around the stereoscopic object 31 such as a box in a wrapping style such as, for example, crisscross. The designative object 111 is associated with displayable data for a bow-style selectable screen 42, which will be described later. The usages A-C correspond to the different usable conditions of the ribbon 32 and are associated with the DBs 211A-211C (see FIG. 4), respectively. In other words, the designative objects 111-113 may be images to exhibit the usable conditions of the ribbon 32. In S2, the editor program 29 displays the images exhibiting the options of usable conditions of the ribbon 32, which are related to the template data units 213, 218, 219, respectively.

In S2, further, the editor program 29 may receive a selection of a usage, which is one of the designative objects 111-113, through an operation by the user. In S3, the editor program 29 specifies one of the DBs 211A-211C corresponding to the usage selected in S2. In the following paragraphs, an exemplary process, which may be conducted in response to the user's selection of the designative object 111, i.e., the usage A, will be described.

In S4, the editor program 29 controls the display 15 to display the bow-style selectable screen 42 (see FIG. 3B) associated with the usage specified in S3. The bow-style selectable screen 42 includes image objects 121-124, which exhibit options of different bow styles in figures or text. The options of bow styles may differ from one another in, for example, a number of loops in the ribbon 32 in the usable condition. The image objects 121, 122, 123, 124 are associated with bow styles of loops of two (2), four (4), multiple, and zero (0), respectively. The editor program 29 may, in S4, control the display 15 to display the options of the bow styles in the image objects 121-124.

Further, in S4, the editor program 29 may receive a selection of the bow style through an operation by the user. In the present embodiment, an exemplary process, which may be conducted in response to the user's selection of the image object 121, i.e., the bow style having two loops, will be described. In S5, the editor program 29 saves the information indicating the bow style selected in S4 as bow-style information.

In S6, the editor program 29 controls the display 15 to display a stereoscopic-object selectable screen 43 (see FIG. 3C) related to the usage, i.e., the usage A, specified in S3. The stereoscopic-object selectable screen 43 indicates stereoscopic objects, which have different shapes, and around which the ribbon 32 may be wrapped. The stereoscopic-object selectable screen 43 includes image objects 131, 132, 133, which are associated with the stereoscopic objects of the rectangular box, the round box, and the bag, respectively. The image objects 131-133 may be in figures or text and displayed as options for the stereoscopic objects. The image objects 131-133 are associated with the information indicating the different stereoscopic objects, respectively.

In S6, further, the editor program 29 may receive a selection of a stereoscopic object, which corresponds to one of the image objects 131, 132, 133, through an operation by the user. In the present embodiment, an exemplary flow, which may be conducted in response to the user's selection of the image object 131 corresponding to the rectangular box, will be described. The flow proceeds to S7. In S7, the editor program 29 saves information indicating the stereoscopic object, e.g., the rectangular box, selected in S6, as stereoscopic-object information.

In S8, the editor program 29 controls the display 15 to display a wrapping-style selectable screen 44 (see FIG. 3D) related to the usage, i.e., the usage A, specified in S3. The wrapping-style selectable screen 44 includes image objects 141-143, which exhibit options of the wrapping styles, or arrangement styles, of the ribbon 32 over the different stereoscopic objects. The arrangement styles include a crisscross style, a straight style, and a two-corners (diagonal) style; and the image objects 141, 142, 143 are associated with the crisscross style, the straight style, and the two-corners style, respectively. Thus, the editor program 29 may control the display 15 to display the options for the wrapping style in S8.

In S8, further, the editor program 29 may receive a selection of a wrapping style, which corresponds to one of the image objects 141, 142, 143, through an operation by the user. In the present embodiment, an exemplary flow, which may be conducted in response to the user's selection of the image object 141 corresponding to the crisscross style, will be described. In S10, the editor program 29 saves the wrapping style selected in S8, i.e., the crisscross style, as wrapping-style information.

Following S10, in S11, the editor program 29 refers to the DB 211A and reads one of the template data units 213 corresponding to the pattern of the bow style, the stereoscopic object, and the wrapping style indicated in the bow-style information, the stereoscopic-object information, and the wrapping-style information, respectively. In the present embodiment, the one of the template data units 213 being currently read to be processed may be called as a focused template data unit. In the present embodiment, for example, the template data unit 213A is read as the focused template data unit. In S11, further, the editor program 29 refers to the data storage area 12B and reads one of the units 216 corresponding to the stereoscopic object indicated in the stereoscopic-object information. In the present embodiment, the one of the stereoscopic-object data units 213 being read to be processed may be called as a focused stereoscopic-object data unit. In the present embodiment, for example, the stereoscopic-object data unit 216A is read as the focused stereoscopic-object data unit.

In S12, the editor program 29 controls the display 15 to display an editor screen 45 (see FIG. 6A) with use of the focused template data unit 213A and the focused stereoscopic-object data unit 216A. The editor screen 45 includes the sheet image 32A, the usable condition image 32B, the stereoscopic object image 31A, an image forming start button object 157, a return button object 158, and a preview button object 159. In the following paragraphs, the image forming start button object 157, the return button object 158, and the preview button object 159 will be called as a start button 157, a return button 158, and a preview button 159, respectively.

The editor program 29 may generate the sheet image 32A (see FIG. 5B) in compliance with the planar-format information, the color information, and the size information included in the sheet data unit 214 and lays out the generated sheet image 32A on the editor screen 45. In the sheet image 32A, the editor program 29 colors the second parts 37A, 37B in grey. Meanwhile, the editor program 29 colors the remaining parts in the sheet image 32A in the color(s) indicated in the color information. In other words, the editor program 29 displays the second parts 37A, 37B differently at least from the first parts 36A, 36B, in a greyed-out format. Thereby, the user may recognize that the second parts 37A, 37B in the greyed-out format are not in editable positions; in other words, the user may recognize that the second parts 37A, 37B may not be edited. Meanwhile, the second parts 37A, 37B may not necessarily be displayed differently, in the greyed-out format, from the first parts 36A, 36B in order to suggest that the second parts 37A, 37B are not editable to the user, but the second parts 37A, 37B may be distinguished from the first parts 36A, 36B by placing mark objects to teach that the second parts 37A, 37B are not editable on the second parts 37A, 37B so that the user viewing the mark object may recognize that the second parts 37A, 37B are not editable.

The editor program 29 further lays out size-designative objects 154A, 154B, 154D, 154F, 154G on the editor screen 45. The size-designative objects 154A, 154B, 154D, 154F, 154G correspond to the tail 34A, the loop 33A, the extra part 35, the loop 33B, and the tail 34B, respectively, in the sheet image 32A. The size-designative objects 154A, 154B, 154D, 154F, 154G may be boxes, in which the user may input the sizes of the corresponding parts. In the following paragraphs, the size-designative objects 154A, 154B, 154D, 154F, 154G may be collectively called as size-indicative objects 154.

The editor program 29 further generates the usable condition image 32B (see FIG. 5A) in compliance with the stereoscopic-format information, the color information, and the size information included in the usable condition data unit 215 and lays out the generated usable condition image 32B on the editor screen 45. In the usable condition image 32B, however, the second parts 37A, 37B may or may not be displayed in the display 15. When the second parts 37A, 37B are not displayed in the display 15, the editor program 29 may not display the second parts 37A, 37B in the greyed-out format. Meanwhile, when the display 15 displays the second parts 37A, 37B in the usable condition image 32B, the editor program 29 may control the second parts 37A, 37B to be displayed in the greyed-out format in the usable condition image 32B. Alternately, the mark objects that teach the second parts 37A, 37B are not editable positions may be placed on the second parts 37A, 37B.

The editor program 29 lays out size-designative objects 155A, 155B, 155F, 155G on the editor screen 45 at positions in proximities to the tail 34A, the loop 33A, the loop 33B, and the tail 34B in the usable condition image 32B, respectively. The size-designative objects 155A, 155B, 155F, 155G correspond to the tail 34A, the loop 33A, the loop 33B, and the tail 34B, respectively. In the following paragraphs, the size-designative objects 155A, 155B, 155F, 155G may be collectively called as size-indicative objects 155.

Optionally, the editor program 29 may lay out text objects indicating default values for the sizes of the corresponding parts in the size-designative objects 154, 155. For example, as shown in FIG. 6A, a text object "3" may be laid out in each of the size-designative objects 154A, 154G, 155A, 155G; a text object "8" may be laid out in each of the size-designative objects 154B, 154F; and a text object "4" may be laid out in each of the size-designative objects 155B, 155F. Optionally, in the size-designative object 154D, a text object of, for example, "0" may be laid out until sizes of three (3) sides of the rectangular box are input by the user.

Further, the editor program 29 generates the stereoscopic image 31A, e.g., the rectangular box, based on the stereoscopic-format information, the color information, and the size information included in the stereoscopic data unit 216A and lays out the stereoscopic image 31A on the editor screen 45. The editor program 29 further lays out size-designative objects 156A, 156B, 156C at positions in proximities to the three sides of the stereoscopic image 31A. In the following paragraphs, the size-designative objects 156A, 156B, 156C may be collectively called as size-indicative objects 156.

The start button 157 is an object to be operated by the user when the user commands the information processing apparatus 100 to output an image formation command to the image forming apparatus 200. The return button 158 is an object to be operated by the user when the user commands the information processing apparatus 100 to cause the screen of the display 15 to return to the wrapping-style selectable screen 44. The preview button 159 is an object to be operated by the user when the user desires to view the image of the ribbon 32 in the usable condition, on which the image based on the imaging data is formed, before the image is actually output from the image forming apparatus 200.

In S12, further, the editor program 29 may receive an operation by the user. While the editor screen 45 is being displayed, the user may operate the user I/F 14 to input various kinds of information including commands and instructions to the information processing apparatus 100 through the editor screen 45. For example, the user may input numbers in the size-designative objects 154-156. For another example, the user may designate any of the start button 157, the return button 158, and the preview button 159. For another example, the user may edit and layout text objects on the sheet image 32A or the usable condition image 32B through operations to the user I/F 14.

Following S12, in S13 (see FIG. 2B), the editor program 29 determines whether the user's operation received in S12 was designation of the return button (see FIG. 6A). If the editor program 29 determines that the operation was not on the return button 158 (S13: NO), the editor program 29 proceeds to S14. On the other hand, in S13, if the editor program 29 determines that the operation was on the return button 158 (S13: YES), the editor program 29 returns to S8 and control the display 15 to display the wrapping-style selectable screen 44. Thereby, the user may select another wrapping style to replace the wrapping style selected previously. Moreover, when the replacing wrapping style is received through the user I/F 14 in S8, in S11, the editor program 29 obtains one of the template data units 213 corresponding to the pattern of the bow style, the stereoscopic object, and the replacing wrapping style selected in S8, as the focused template data unit. In S12, the editor program 29 controls the display 15 to display the editor screen 45 based on the focused template data unit 213.

Meanwhile, the flow from the affirmative determination in S13 (S13: YES) may not necessarily be directed to S8 but may be, for example, directed to S6, in which the editor program 29 controls the display 15 to display the stereoscopic-object selectable screen 43. In this flow, the user may select another stereoscopic object to replace the stereoscopic object selected previously through the user I/F 14.

In S14, the editor program 29 determines whether an operation to designate a position in any of the parts in either the sheet image 32A or the usable condition image 32B in the editor screen 45, except the second parts 37A, 37B, was input through the user I/F 14. In the following description, a position in any of the parts in the sheet image 32A and the usable condition image 32B in the editor screen 45 except the second parts 37A, 37B will be called as a designative position. If the user's operation designated a designative position (S14: YES), the editor screen 29 proceeds to S15. If the user's operation did not designate a designative position (S14: NO), the editor screen 29 proceeds to S19. Meanwhile, if the user's operation designated a position in either the second part 37A or the second part 37B, the editor program 29 may control the display 15 to display a message advising the user to designate a position in any of the parts in either the sheet image 32A or the usable condition image 32B rather than the second parts 37A, 37B on the editor screen 45.

In S19, the editor program 29 determines whether the user's operation designated one of the size-designative objects 154-156. If the user's operation did not designate any one of the size-designative objects 154-156 (S19: NO), the editor program 29 proceeds to S114. If the user's operation designated one of the size-designative objects 154-156 (S19: YES), in S110, the editor program 29 controls the display 15 to display an object (not shown) expressing software numerical keys. Through the software numerical keys in the object and the user I/F 14, the editor program 29 may receive input of a numerical value from the user. In S111, the editor program 29 conducts a text-adding process to the size-designative object.

For example, the user may input sizes of the three (3) sides of the stereoscopic object 31. More specifically, the user may have designated one of the size-designative objects 156A-156C in S12 and, in S110, may input a numerical value for one of the three sizes of the stereoscopic object 31 corresponding to the one of the size-designative objects 156A-156C designated in S12. The editor program may receive the numerical value as the one of the three sizes of the stereoscopic object 31. Thereafter, in S111, the editor program 29 may add a text object indicating the numerical value received in S111 on the one of the size-designative objects 156A-156C. Meanwhile, there may be a case that the text object to be laid out has a larger size than the designated one of the size-designative objects 156A-156C due to a reason such as, for example, that the numerical value has a large number of digits or has a larger font size. In such an occasion, the editor program 29 may change the size of the designated one of the size-designative objects 156A-156C, on which the text object is to be added. Optionally, the editor program 29 may resize the stereoscopic image 31A on the editor screen 45 according to the numerical value received in S111.

In S112, the editor program 29 updates the screen in the display 15 and returns to S12. In particular, in S112, the editor program 29 generates displayable data, which composes the editor screen 45 with the one of the size-designative objects 156A-156C processed through the text-adding process, and in S12, the controls the display 15 to display the editor screen 45 (see FIG. 6B) based on the displayable data generated in S112.

The editor program 29 repeats S12-S14 and S19-S112 until the user completes inputting the sizes of the three sides. Accordingly, the display 15 may display the editor screen 45 with the sizes of the three sides of the stereoscopic object 31 added thereon (see FIG. 6B). In other words, as shown in FIG. 6B, the sizes "20," "15," "8" are laid out in the size-designative objects 156A, 156B, 156C, respectively.

When the sizes of the three sides of the stereoscopic object 31 are input, the editor program 29 calculates a length of the extra part 35 in the ribbon 32 in the sheet format. The length of the extra part 35 may be, for example, 102 cm when the rectangular box being the stereoscopic object 31 has longitudinal, widthwise, and vertical sizes of 20 cm, 15 cm, and 8 cm, respectively. Therefore, the editor program 29 may lay out a text object indicating 102 cm added on the size-designative object 154D (see FIG. 6B).

Alternately, in S12, the user may designate sizes of the parts in the sheet image 32A or the usable condition image 32B through the size-designative objects 154 or the size-designative objects 155. In particular, the user may designate one of the size-designative objects 154, 155 through the user I/F 14. Thereafter, the user may input a numerical value through the software numerical keys displayed in S110 and the user I/F 14. In S110, the editor program 29 may receive the numerical value input by the user. In S111, the editor program 29 may lay out a text object indicating the numerical value received in S110 added on the one of the size-designative objects 154, 155 designated in S12.

For example, the user may designate the size-designative object 155F in S12 and input a numerical value of "4.5" in S110, in S111, the editor program 29 may lay out a text object indicating "4.5 cm" added on the size-designative object 155F (see FIG. 7A). Optionally, in S111, the size-designative object 155F may be resized depending on a number of digits in the numerical value input by the user. Moreover, the editor program 29 may resize the first part 36B in the usable condition image 32B, which corresponds to the size-designative object 155F, to a size corresponding to the numerical value input in S110.

Optionally, the editor program 29 may resize the first part 36A in the usable condition image 32B to reflect the resizing of the first part 36B in the usable condition image 32B. In particular, the editor program 29 may determine whether the usable condition data unit 215 in the template data unit 213A includes the pair-correspondence information 222B for the first part 36B. If the editor program 29 determines that the usable condition data unit 215 in the template data unit 213A includes the pair-correspondence information 222B for the first part 36B, with reference to the pair-correspondence information 222B, the editor program 29 may identify the first part 36A, which is paired with the first part 36B in the usable condition image 32B to form the pair 5. The editor program 29 may resize the first part 36A so that the size of the first part 36A may be equal to the size of the resized first part 36B. The editor program 29 may, further, reflect the resizing of the first part 36A in the usable condition image 32B into the size-designative object 155B. In other words, the editor program 29 may lay out a text object indicating the size of the resized first part 36A, e.g., 4.5 cm, added on the size-designative object 155B (see FIG. 7B).

Moreover, the editor program 29 resizes the first part 36B in the sheet image 32A to reflect the resizing of the first part 36B in the usable condition image 32B. In particular, the editor program 29 may determine whether the usable condition data unit 215 in the template data unit 213A includes the identical-part correspondence information 223C for the first part 36B. If the editor program 29 determines that the usable condition data unit 215 in the template data unit 213A includes the identical-part correspondence information 223C for the first part 36B, with reference to the identical-part correspondence information 223C, the editor program 29 may identify the first part 36B, which is the identical part 3 to the first part 36B in the usable condition image 32B. The editor program 29 may resize the first part 36B in the sheet image 32A so that the size of the first part 36B may be equal to the size of the resized first part 36B in the usable condition image 32B (see FIG. 7C). Optionally, the editor program 29 may, further, resize the second part 37B in the sheet image 32A so that the size of the second part 37B may be reflectively equal to the size of the resized first part 36B in the sheet image 32A. Furthermore, the editor program 29 may reflect the resizing of the first part 36A and the second part 37B in the sheet image 32A into the size-designative object 154F. In other words, the editor program 29 may lay out a text object indicating the size of the resized first part 36A, e.g., 9 cm, added on the size-designative object 155B.

Optionally, the editor program 29 may resize the first part 36A in the sheet image 32A to reflect the resizing of the first part 36B in the sheet image 32A. In particular, the editor program 29 may determine whether the sheet data unit 214 in the template data unit 213A includes the pair-correspondence information 221B for the first part 36B. If the editor program 29 determines that the sheet data unit 214 in the template data unit 213A includes the pair-correspondence information 221B for the first part 36B, with reference to the pair-correspondence information 221B, the editor program 29 may identify the first part 36A, which is paired with the first part 36B in the sheet image 32A to form the pair 2. The editor program 29 may resize the identified first part 36A so that the size of the first part 36A may be equal to the size of the resized first part 36B. Optionally, the editor program 29 may, further, reflect the size of the second part 37B in the sheet image 32A so that the size of the second part 37B may be equal to the size of the resized first part 36B in the sheet image 32A. The editor program 29 may, further, reflect the resizing of the first part 36A and the second part 37A in the sheet image 32A into the size-designative object 154B.

Thus, based on the user's operation to add the text object in one of the size-designative objects 155, e.g., the size-designative object 155F, in the usable condition image 32B alone, the editor program 29 may automatically modify the size-designative objects 154, 155, which are associated with the first part 36A in the usable condition image 32B. Therefore, the user may find the editor program 29 useful.

Following S111 explained in the paragraphs above, which is conducted when the user designated one of the size-designative objects 154, 155, the editor program 29 proceeds to S112. In S112, the editor program 29 updates the screen in the display 15 and returns to S12.

In S12, if the user designates a designative position by an operation through the user I/F 14 (S13: NO), in S15-S16, the user may lay out a text object in the sheet image 32A or the usable condition image 32B. In the following description, an exemplary flow, which may be conducted in response to the user's designation of a designative position P1 (see FIG. 8A) in the first part 36A in the usable condition image 32B, will be described.

In S15, the editor program 29 controls the display 15 the display an object (not shown) expressing a software keyboard and receive input operations, i.e., text input, through the user I/F 14, In S16, the editor program 29 conducts a text-adding process to the designative position P1.

For example, the user may input a text string, or characters, e.g., "Thank" as shown in FIG. 8B, through the software keyboard and the user I/F 14. Next, the editor program 29 generates a text object 160 indicating the input text string based on a preset font style and a size of the font. The characters "Thank" contained in the text object 160 may align with a preset direction, e.g., a crosswise direction in the screen of the display 15. In the following description, the text object 160 containing a plurality of characters aligning with the lengthwise direction 5 may be called as an unrotated text object. The editor program 29 obtains the orientation information concerning the first part 36A from the template data unit 213A being the focused template data unit and rotates the text object 160 automatically so that the characters in the generated text object 160 should align with the aligning direction 7 indicated in the obtained orientation information (see FIG. 8C).

Next, the editor program 29 determines whether, when the rotated text object 160 is laid out on the designative position P1, the text object 160 should be partly located outside the part, e.g., the first part 36A in the usable condition image 32B, which contains the designative position P1 in the sheet image 32A or the usable condition image 32B. The determination may be made based on the size of the generated text object 160, the designative position P1, and the size information concerning the first part 36A in the usable condition image 32B contained in the template data unit 213 being the focused template data unit.

If the editor program 29 determines that the text object 160 should not be located outside the first part 36A in the usable condition image 32B, the editor program 29 adds the text object 160 on the first part 36A (see FIG. 8B).

Next, the editor program 29 reflects the addition of the text object 160 on the first part 36A in the usable condition image 32B to the first part 36A in the sheet image 32A. In particular, the editor program 29 determines whether the usable condition data unit 215 in the template data unit 213A being the focused template data unit contains the identical-part correspondence information 223A for the first part 36A. If the usable condition data unit 215 in the template data unit 213A contains the identical-part correspondence information 223A for the first part 36A, with reference to the identical-part correspondence information 223A, the editor program 29 identifies the first part 36A in the sheet image 32A being the identical part 1 to the first part 36A in the usable condition image 32B. The editor program 29 lays out the unrotated text object 160 at a position corresponding to the designative position P1 in the first part 36A in the sheet image 32A (see FIG. 8D).

Figure 9A:
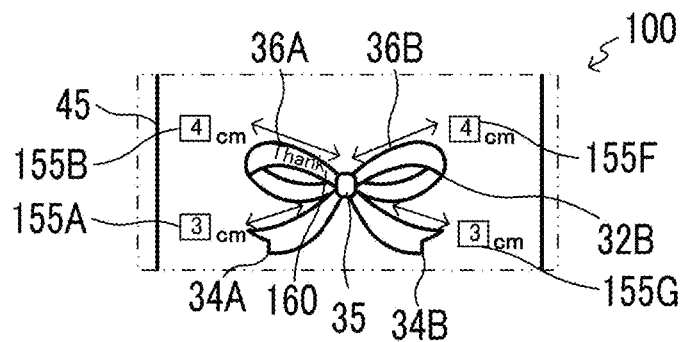
Figure 9B:
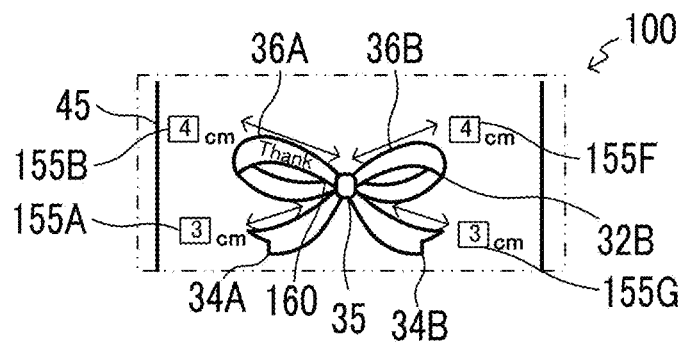
Figure 9C:
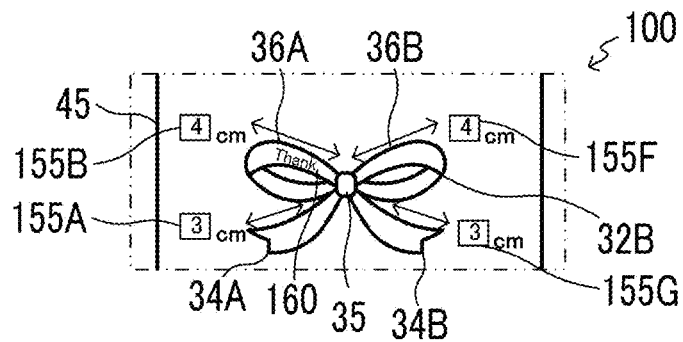
Figure 9D:
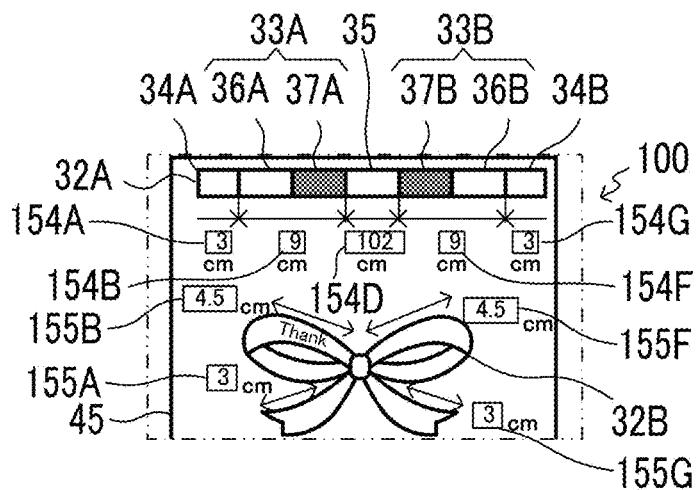

On the other hand, if the editor program 29 determines that the text object 160 should be partly located outside the first part 36A in the usable condition image 32B (see FIG. 9A), the editor program 29 resizes the first part 36A so that the text object 160 to be laid out at the designative position P1 should fit within the first part 36A and adds the text object 160 on the resized first part 36A (see FIG. 9B). Alternately, the editor program 29 may resize the text object 160 so that the resized text object 160 laid out at the designative position P1 should stay within the first part 36A and add the resized text object 160 on the first part 36A (see FIG. 9C). Thus, the editor program 29 may resize the first part 36A, or the text object 160, automatically so that the first part 36A should accommodate the user's desired text string therein. Therefore, the user may easily lay out the text object 160.

Next, the editor program 29 reflects the addition of the text object 160 on the first part 36A in the usable condition 32B to the first part 36A in the sheet image 32A, in the similar manner described above. In other words, the editor program 29 adds the unrotated text object 160 in the resized first part 36A in the manner as shown in FIG. 8D. Further, the editor program 29 resize the first part 36A and the second part 37A, i.e., the loop 33A, in the sheet image 32A to correspond to the resized first part 36A in the usable condition image 32B.

Next, the editor program 29 resize the size-designative object 155B to reflect the resizing of the first part 36A in the usable condition image 32B. In other words, the editor program 29 lays out a text object, e.g., "4.5 cm", indicating the size of the resized first part 36A, for the size-designative object 155B (see FIG. 9D). Moreover, the editor program 29 reflects the resizing of the first part 36A and the second part 37A in the usable condition image 32B to the size-designative object 154B. In other words, the editor program 29 lays out a text object, e.g., "9 cm", indicating the size of the resized loop 33A for the size-designative object 154B (see FIG. 9D).

Moreover, the editor program 29 reflects the resizing of the first part 36A in the usable condition image 32B to the first part 36B in the usable condition image 32B in the similar manner described above. In particular, the editor program 29 identifies the first part 36B, which is paired with the first part 36A in the usable condition image 32B to form the pair 5 with reference to the pair-correspondence information 222B. The editor program 29 may resize the first part 36B so that the size of the first part 36B may be equal to the resized first part 36A. Moreover, the editor program 29 reflects the resizing of the first part 36B in the usable condition image 32B to the size-designative object 155F. In other words, the editor program 29 lays out a text object, e.g., "4.5 cm", indicating the size of the resized first part 36B for the size-designative object 155F (see FIG. 9D).

Optionally, the editor program 29 may reflect the resizing of the first part 36A and the second part 37A in the sheet image 32A to the first part 36B and the second part 37B in the sheet image 32A with reference to the pair-correspondence information 221B, 221C, In other words, the editor program 29 may resize the first part 36B and the second part 37B in the sheet image 32A so that the sizes of the first part 36B and the second part 37B may be equal to the sizes of the resized first part 36A and the second part 37A. Moreover, the editor program 29 may lay out a text object, e.g., "9 cm", indicating the size of the resized loop 33B, for the size-designative object 154F.

The process in S16 (see FIG. 2B) is thus completed. The editor program 29 proceeds to S17. In S17, the editor program 29 updates the screen in the display 15 and returns to S12. In other words, in S17, the editor program 29 generates displayable data composing the editor screen 45, in which the text object 160 is added at the designative position P1 in the text-adding process in S16, and in S12, controls the display 15 to display the editor screen 45 based on the generated displayable data. Further, the user may repeat the text-adding process to add another text string to another part in the sheet image 32A or the usable condition image 32B by the operations through the user I/F 14. For example, the user may designate the first part 36B in the usable condition image 32B in S12 and input a text string, e.g., "You!!" in S110. Thus, the editor program 29 may lay out the text object "You!!" (see FIG. 6B) in the same process described above in S16 to be displayed in the display 15.

Meanwhile, in S19, the editor program 29 may determine that the user's operation did not designate any of the size-designative objects 154-156 (S19: NO) and proceed to S114. In S114, the editor program 29 determines whether the user's operation designates the preview button 159 (see FIG. 6A). If the user's operation designates the preview button 159 (S114: YES), the editor program 29 generates displayable data composing the sheet image 32A, which was generated in at least one of S16 and S111. In S115, the editor program 29 controls the display 15 to display the sheet image 32A based on the generated displayable data.

S114, on the other hand, if the editor program 29 determines that the user's operation did not designate the preview button 159 (S114: NO), in S116, determines whether the user's operation designated the start button 157. If the editor program 29 determines that the user's operation designated the start button (S116: YES), the editor program 29 generates displayable data composing the sheet image 32A, which was generated in at least one of S16 and S111. Optionally, the editor program 29 may add linear object(s) indicating position(s), at which the ribbon 32 may be bent, in the sheet image 32A. In S117, the editor program 29 passes the imaging data together with an image formation command to the OS 28, and the OS 28 outputs the imaging data and the image formation command to the image forming apparatus 200.

In S116, if the editor program 29 determines that the user's operation did not designate the start button 157 (S116: NO), in S119, the editor program 29 conducts a process corresponding to the operation. For example, the editor program 29 may save the imaging data composing the sheet image 32A generated in at least one of S16 and S111 in the data storage area 12B. For another example, the editor program 29 may set up for the image formation of the imaging data in the image forming apparatus 200 in response to the user's operations and return to S12. For another example, further, if the user's operation designated an end button (not shown), the editor program 29 conducts a terminating process, and the process in FIGS. 2A-2B may be terminated.

According to the editor program 29 described above, the user may visually recognize the sheet image 32A and the usable condition image 32B being edited through the display 15. In other words, image editing adaptable to a sheet, which may be shaped stereoscopically to be used by the user, may be provided.

Moreover, the second parts 37A, 37B may be displayed in the greyed-out format. Therefore, the user may recognize the parts that may not be edited easily.

Figure 2B:
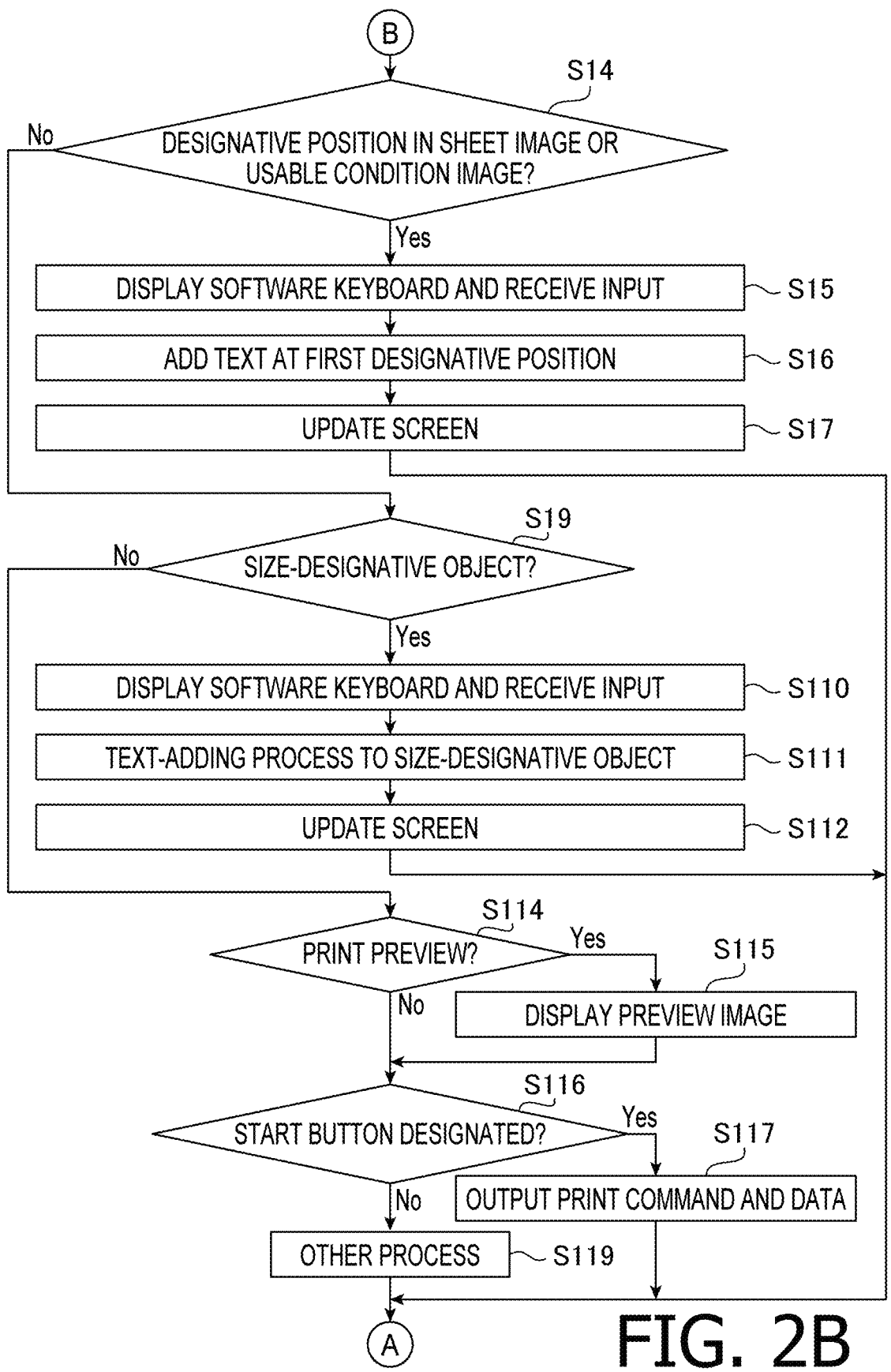

Moreover, the editor program 29 may, in response to the user' operation to designate the return button 158 (see FIG. 2B, S13: YES), display the wrapping-style selectable screen 44 or the stereoscopic-object selectable screen 43 once again. Therefore, the user may not be forced to start anew from selection of the template in order to change the editor screen 45.

Moreover, the editor program 29 may adjust the size of the text object 160 automatically so that the text object 160 should fit within the first parts 36A, 36B in the sheet image 32A and the usable condition image 32B. Therefore, the usability to the user may be improved.

Moreover, the editor program 29 may reflect the result of the text-adding process, which is conducted in S16 and S111 (see FIG. 2B) to one of the sheet image 32A and the usable condition image 32B, to the other of the sheet image 32A and the usable condition image 32B. Therefore, the usability to the user may be improved.

Moreover, the editor program 29 may reflect the result of resizing of the first parts 36A, 36B, which are were resized in S16 and S111 (see FIG. 2B), in one of the sheet image 32A and the usable condition image 32B, to the first parts 36A, 36B in the other of the sheet image 32A and the usable condition image 32B. Therefore, the usability to the user may be improved.

Although an example of carrying out the invention has been described, those skilled in the art will appreciate that there are numerous variations and permutations of the information processing apparatus and the computer-readable storage medium that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, in the embodiment described above, the editor program 29 controls the display 15 to display the sheet image 32A and the usable condition image 32B simultaneously in the editor screen 45. Under this control, the user may visually recognize both the sheet image 32A and the usable condition image 32B simultaneously. However, the editor program 29 may control the display 15 to display the sheet image 32A and the usable condition image 32B in separate screens.

As shown in FIG. 1, the program storage area 12A may store the driver 210 for the image forming apparatus 200. The driver 210 may receive the imaging data through the OS 28. The driver 210 may convert the imaging data into a format, which is feasible to the image forming apparatus 200 to form the image. The driver 210 may transmit the converted imaging data to the image forming apparatus 200 through the communication network 300.

For another example, the sheet to be used to form an image thereon may not necessarily be limited to the ribbon 32 but may include, for example, origami paper. In other words, as shown in FIG. 10, the editor program 29 may edit the sheet image 32A and the usable condition image 32B of origami paper 39 being in a sheet format. In particular, for example, the usable condition image 32B for the origami paper 39 may express a stereoscopic format, e.g., paper plane, when the origami paper 39 is deformed into the usable condition.

For another example, the editor program 29 may not necessarily resize the sheet image 32A or the usable condition image 32B automatically in response to the numerical values added on the size designative objects but may resize the sheet image 32A and the usable condition image 32B in response to the user's operation input through the user I/F 14.

For another example, the data storage area 12B may store video data corresponding to each of the wrapping styles and the stereoscopic objects. The video data may exhibit how to form different loops, knots, and how to wrap the sheet around different stereoscopic objects to make the gift wrapping. The editor program 29 may, in response to the user's operations input through the user I/F 14, control the display 15 to play movies described in the video data corresponding to the bow-style information, the stereoscopic-object information, and the wrapping information stored in the flow shown in FIGS. 2A-2B.

For another example, the image forming apparatus 200 may not necessarily be limited to a printing apparatus but may include, for example, an embroidery machine for forming an image composed in imaging data on a piece of fabric being a sheet with embroidery threads.

What is claimed is:

1. A non-transitory computer-readable storage medium storing computer-readable instructions for an information processing apparatus comprising a display and a user interface, the computer-readable instructions, when executed by a processor of the information processing apparatus, causing the information processing apparatus to perform:
controlling the display to precedingly display a sheet image representing a sheet and a usable condition image representing the sheet in a usable condition deformed stereoscopically to be used by a user;
in response to receiving of an editing operation to instruct the information processing apparatus to perform image-editing, through the user interface, designating a predetermined position in one of the sheet image and the usable condition image being precedingly displayed in the display, specifying a corresponding position corresponding to the predetermined position, the corresponding position being contained in the other of the sheet image and the usable condition image, and controlling the display to subsequently display:
the sheet image containing one of the predetermined position and the corresponding position, the sheet image being, when containing the predetermined position, edited as instructed by the editing operation, but when containing the corresponding position, edited correspondingly to the image-editing in the usable condition image; and
the usable condition image containing the other of the predetermined position and the corresponding position, the sheet image being, when containing the predetermined position, edited as instructed by the editing operation, but when containing the corresponding position, edited correspondingly to the image-editing in the sheet image; and
generating imaging data to be used for creating the sheet as represented in the sheet image having been edited and displayed subsequently in the display and outputting the generated imaging data externally.

2. The non-transitory computer-readable storage medium according to claim 1,
wherein the computer-readable instructions, when executed by the processor, further cause the information processing apparatus to perform obtaining one of a plurality of template data units selected by a selecting operation through the user interface from a memory;
wherein each of the plurality of template data units includes:
sheet data composing the sheet image;
usable condition data composing the usable condition image; and
position-correspondence information associating first position information and second position information with each other, the first position information indicating a position in the sheet image, the second position information indicating a position in the usable image, the predetermined position coinciding with one of the positions indicated in the first position information and the second position information;
wherein the computer-readable instructions, when executed by the processor, for precedingly displaying the sheet image and the usable condition image, cause the information processing apparatus to perform controlling the display to display the sheet image and the usable condition image based on the sheet data and the usable condition data included in the selected one of the plurality of template data units; and
wherein the computer-readable instructions, when executed by the processor in response to receiving of the editing operation designating the predetermined position through the user interface, cause the information processing apparatus to perform specifying the other of the positions indicated the first position information and the second position information being associated with each other in the position-correspondence information as the corresponding position.

3. The non-transitory computer-readable storage medium according to claim 2,
wherein the computer-readable instructions, when executed by the processor, further cause the information processing apparatus to perform controlling the display to display a usable-condition selectable image, in which a plurality of usable conditions for the sheet are exhibited as options for the usable condition, and in which each of the plurality of usable conditions is associated with one of the plurality of template data units correspondingly;
wherein the computer readable instructions, when executed by the processor in response to receiving of the selecting operation through the user interface, the selecting operation including selecting one of the plurality of usable conditions in the usable-condition selectable image displayed in the display, cause the information processing apparatus to perform obtaining the one of the plurality of template data units corresponding to the selected one of the plurality of usable conditions from the memory.

4. The non-transitory computer-readable storage medium according to claim 2,
wherein each of the plurality of template data units includes:
first editable-position information indicating a position, in which the image-editing is enabled, in the sheet image; and
second editable-position information indicating a position, in which the image-editing is enabled, in the usable condition image, and
wherein the computer-readable instructions, when executed by the processor, for precedingly displaying the sheet image and the usable condition image, cause the information processing apparatus to perform controlling the display to display:
the sheet image, in which the position indicated in the first editable-position information and a position not indicated in the first editable-position information are displayed in different formats; and
the usable condition image, in which the position indicated in the second editable-position information and a position not indicated in the second editable-position information are displayed in different formats.

5. The non-transitory computer-readable storage medium according to claim 2, wherein each of the plurality of template data units includes:
stereoscopic-object information identifying one of a plurality of stereoscopic objects, on which the sheet is arrangeable; and
arrangement-style information identifying one of a plurality of arrangement styles to arrange the sheet on the one of the plurality of stereoscopic objects,
wherein the computer-readable instructions, when executed by the processor, cause the information processing apparatus to perform:
controlling the display, prior to precedingly displaying the sheet image and the usable condition image, to display:
a plurality of first option images exhibiting the plurality of stereoscopic objects as options, each of which corresponds to the stereoscopic-object information identifying one of the plurality of stereoscopic objects; and
a plurality of second option images exhibiting the plurality of arrangement styles as options, each of which corresponds to the arrangement-style information identifying one of the plurality of arrangement styles, and
wherein the computer-readable instructions, when executed by the processor, in response to receiving of selecting operations to select one of the plurality of stereoscopic objects and one of the plurality of arrangement styles through the user interface, cause the information processing apparatus to perform specifying the one of the plurality of template data units based on the stereoscopic-object information corresponding to the selected one of the plurality of stereoscopic objects and the arrangement-style information corresponding to the selected one of the plurality of arrangement styles, and obtaining the specified one of the plurality of template data units from the memory.

6. The non-transitory computer-readable storage medium according to claim 5,
wherein the computer-readable instructions, when executed by the processor, after the sheet image and the usable condition image are precedingly displayed, and in response to receiving of a reselecting operation through the user interface to reselect another one of the plurality of arrangement styles, cause the information processing apparatus to perform specifying another one of the plurality of template data units based on the stereoscopic-object information corresponding to the reselected one of the plurality of stereoscopic objects and the arrangement-style information corresponding to the reselected one of the plurality of arrangement styles, and obtaining the specified another one of the plurality of template data units from the memory, and
wherein the computer-readable instructions, when executed by the processor, for once again precedingly displaying the sheet image and the usable condition image, cause the information processing apparatus to perform controlling the display to display the sheet image and the usable condition image based on the sheet data and the usable condition data included in the specified another one of the plurality of template data units obtained in response to receiving of the reselecting operation.

7. The non-transitory computer-readable storage medium according to claim 5,
wherein each of the plurality of template data units includes:
first editable-position information indicating a position, in which the image-editing is enabled, in the sheet image; and
second editable-position information indicating a position, in which the image-editing is enabled, in the usable condition image, the first editable-position information and the second editable-position information being preset based on the arrangement-style information,
wherein the computer-readable instructions, when executed by the processor, for precedingly displaying the sheet image and the usable condition image, cause the information processing apparatus to perform controlling the display to display:
the sheet image, in which the position indicated in the first editable-position information and a position not indicated in the first editable-position information are displayed in different formats; and
the usable condition image, in which the position indicated in the second editable-position information and a position not indicated in the second editable-position information are displayed in different formats.

8. The non-transitory computer-readable storage medium according to claim 7,
wherein the computer-readable instructions, when executed by the processor, for subsequently displaying the sheet image and the usable condition image, cause the information processing apparatus to perform:
in response to receiving of the editing operation, the editing operation including laying out an object at a position indicated in one of the first editable-position information and the second editable-position information, through the user interface, determining whether the object is partly located outside the position indicated in the one of the first editable-position information and the second editable-position information, and
in response to determining that the object is partly located outside the position indicated in the one of the first editable-position information and the second editable-position information, resizing a range for the position indicated in the one of the first editable-position information and the second editable-position information to a size to accommodate the object.

9. The non-transitory computer-readable storage medium according to claim 7,
wherein the computer-readable instructions, when executed by the processor, for subsequently displaying the sheet image and the usable condition image, cause the information processing apparatus to perform:
in response to receiving of the editing operation, the editing operation including laying out an object at a position indicated in one of the first editable-position information and the second editable-position information, through the user interface, determining whether the object is partly located outside one of the sheet image and the usable condition image corresponding to the one of the first editable-position information and the second editable-position information, and
in response to determining that the object is partly located outside the one of the sheet image and the usable condition image corresponding to the one of the first editable-position information and the second editable-position information, resizing the sheet image and the usable condition image to sizes to accommodate the object.

10. The non-transitory computer-readable storage medium according to claim 7,
wherein the position-correspondence information includes first editing-position correspondence information, the first editing-position correspondence information associating the first editable-position information and the second editable-position information correspondingly with each other,
wherein the computer-readable instructions, when executed by the processor, for subsequently displaying the sheet image and the usable condition image, in response to receiving of the editing operation through the user interface, designating one of the positions indicated in the first editable-position information and the second editable-position information as an objective position, the editing operation including resizing of one of the sheet image and the usable condition image containing the objective position, cause the information processing apparatus to perform:
specifying the other of the positions indicated in the first editable-position information and the second editable-position information associated with each other in the first editing-position correspondence information as the corresponding position, and
controlling the display to display:
the sheet image containing one of the objective position and the corresponding position, the sheet image being, when containing the objective position, resized as instructed by the editing operation, but when containing the corresponding position, resized correspondingly to the resizing of the usable condition image; and
the usable condition image containing the other of the objective position and the corresponding position, the usable condition image being, when containing the objective position, resized as instructed by the editing operation, but when containing the corresponding position, resized correspondingly to the resizing of the sheet image.

11. The non-transitory computer-readable storage medium according to claim 7,
wherein the second editable-position information indicates:
a first specific part being a part of the sheet in the usable condition deformed stereoscopically; and
a second specific part being paired with the first specific part of the sheet in the usable condition deformed stereoscopically,
wherein each of the plurality of template data units further includes specific-part correspondence information, the specific-part correspondence information associating the first specific part and the second specific part with each other correspondingly,
wherein the computer-readable instructions, when executed by the processor, for subsequently displaying the sheet image and the usable condition image, in response to receiving of the editing operation, through the user interface, designating an objective position in one of the first specific part and the second specific part, the editing operation including resizing of the one of the first specific part and the second specific part containing the objective position, cause the information processing apparatus to perform:
specifying the other of the first specific part and the second specific part associated in the specific-part correspondence information with the one of the first specific part and the second specific part containing the objective position; and
controlling the display to display the usable condition image, in which the one of the first specific part and the second specific part containing the objective position is resized as instructed by the editing operation and the other of the first specific part and the second specific part associated with the one of the first specific part and the second specific part is resized correspondingly to the resizing of the one of the first specific part and the second specific part.

12. The non-transitory computer-readable storage medium according to claim 7,
wherein the memory stores a plurality of stereoscopic-object data units, each of which composing a stereoscopic object image, and each of which includes third editable-position information, the third editable-position information indicating a position, in which the image-editing is enabled in the stereoscopic object image,
wherein the position-correspondence information includes second editing-position correspondence information, the second editing-position correspondence information associating the first editable-position information and the second editable-position information with the third editable-position information correspondingly,
wherein the computer-readable instructions, when executed by the processor, for obtaining the one of the plurality of template data units, cause the information processing apparatus to obtain one of the plurality of stereoscopic-object data units based on the selected one of the plurality of stereoscopic objects from the memory,
wherein the computer-readable instructions, when executed by the processor, for precedingly displaying the sheet image and the usable condition image, cause the information processing apparatus to perform controlling the display to further display the stereoscopic object image based on the obtained one of the stereoscopic-object data units, and
wherein the computer-readable instructions, when executed by the processor, for subsequently displaying the sheet image and the usable condition image, in response to receiving of the editing operation, through the user interface, the editing operation including resizing of the stereoscopic object image containing an objective position, the objective position being a position indicated in the third editable-position information, cause the information processing apparatus to perform:
specifying the positions indicated in the first editable-position information and the second editable-position information associated with the third editable-position information in the second editing-position correspondence information as the corresponding position, and
controlling the display to display:
the stereoscopic object image resized as instructed by the editing operation, and
the sheet image and the usable condition image resized correspondingly to the resizing of the stereoscopic object.

13. The non-transitory computer-readable storage medium according to claim 12, wherein the computer-readable instructions, when executed by the processor, after the stereoscopic object image is displayed precedingly, and in response to receiving of a reselecting operation through the user interface to reselect another one of the plurality of stereoscopic objects, cause the information processing apparatus to perform specifying another one of the plurality of stereoscopic-object data units based on the stereoscopic-object information corresponding to the reselected one of the plurality of stereoscopic objects, and obtaining the specified another one of the plurality of stereoscopic-object data units from the memory, and wherein the computer-readable instructions, when executed by the processor, for once again precedingly displaying the sheet image and the usable condition image, cause the information processing apparatus to perform controlling the display to display the another one of the plurality of stereoscopic objects based on the specified another one of the plurality of stereoscopic-object data units obtained in response to receiving of the reselecting operation.

14. An information processing apparatus, comprising:
a display;
a user interface; and
a control device configured to:
    control the display to precedingly display a sheet image representing a sheet and a usable condition image representing the sheet in a usable condition deformed stereoscopically to be used by a user;
    in response to receiving of an editing operation to instruct the information processing apparatus to perform image-editing, through the user interface, designating a predetermined position in one of the sheet image and the usable condition image being precedingly displayed in the display, specify a corresponding position corresponding to the predetermined position, the corresponding position being contained in the other of the sheet image and the usable condition image, and control the display to subsequently display:
        the sheet image containing one of the predetermined position and the corresponding position, the sheet image being, when containing the predetermined position, edited as instructed by the editing operation, but when containing the corresponding position, edited correspondingly to the image-editing in the usable condition image; and
        the usable condition image containing the other of the predetermined position and the corresponding position, the sheet image being, when containing the predetermined position, edited as instructed by the editing operation, but when containing the corresponding position, edited correspondingly to the image-editing in the sheet image; and
    generate imaging data to be used for creating the sheet as represented in the sheet image having been edited and displayed subsequently in the display and output the generated imaging data externally.

* * * * *